(12) United States Patent
Popoola et al.

(10) Patent No.: US 11,049,666 B2
(45) Date of Patent: Jun. 29, 2021

(54) FABRICATION OF PLATINUM COUNTER ELECTRODES FOR BIFACIAL DYE-SENSITIZED SOLAR CELLS

(71) Applicants: KING FAHD UNIVERSITY OF PETROLEUM AND MINERALS, Dhahran (SA); Imam Abdulrahman Bin Faisal University, Dammam (SA)

(72) Inventors: Idris Kayode Popoola, Dhahran (SA); Muhammad Ashraf Gondal, Dhahran (SA); Jwaher M. Alghamdi, Dammam (SA); Talal F. Qahtan, Dhahran (SA)

(73) Assignees: KING FAHD UNIVERSITY OF PETROLEUM AND MINERALS, Dhahran (SA); Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 16/232,758

(22) Filed: Dec. 26, 2018

(65) Prior Publication Data

US 2019/0311859 A1    Oct. 10, 2019

Related U.S. Application Data

(60) Provisional application No. 62/654,033, filed on Apr. 6, 2018.

(51) Int. Cl.
*H01G 9/20* (2006.01)
*H01G 9/00* (2006.01)

(52) U.S. Cl.
CPC ......... *H01G 9/2022* (2013.01); *H01G 9/0029* (2013.01); *H01G 9/204* (2013.01);
(Continued)

(58) Field of Classification Search
CPC .. H01G 9/2022; H01G 9/2031; H01G 9/2013; H01G 9/2027; H01G 9/0029; H01G 9/204; H01G 9/2059
(Continued)

(56) References Cited

U.S. PATENT DOCUMENTS

2005/0260786 A1* 11/2005 Yoshikawa .......... H01G 9/2009
                                                                                  438/85
2011/0240112 A1* 10/2011 Ahn ..................... H01G 9/2095
                                                                                  136/256
(Continued)

FOREIGN PATENT DOCUMENTS

| CN | 102789906 A | 11/2012 |
| CN | 102915851 A | 2/2013 |
| CN | 103165290 A | 6/2013 |

OTHER PUBLICATIONS

Mohammad Sabet, et al., "Using a low temperature method to fabrication of flexible dye sensitized solar cells with three different counter electrodes", Journal of Materials Science: Materials in Electronics; vol. 29, Issue 1, Jan. 2018, pp. 778-783 (Abstract only).
(Continued)

*Primary Examiner* — Caleen O Sullivan
(74) *Attorney, Agent, or Firm* — Oblon, McClelland, Maier & Neustadt, L.L.P.

(57) ABSTRACT

A fabrication method for a flexible bifacial dye-sensitized solar cell is described. The method involves forming a flexible counter electrode of crystalline Pt nanoparticles on a first conductive layer by irradiating a precursor solution with a UV lamp. A flexible photoanode is formed by applying metal oxide particles to a second conductive layer, and then the solar cell is constructed by sandwiching an electrolyte between the counter electrode and photoanode.

19 Claims, 30 Drawing Sheets

(52) U.S. Cl.
CPC ......... *H01G 9/2013* (2013.01); *H01G 9/2027* (2013.01); *H01G 9/2031* (2013.01)

(58) Field of Classification Search
USPC .......................................... 438/85
See application file for complete search history.

(56) References Cited

U.S. PATENT DOCUMENTS

2015/0083216 A1    3/2015  Ko et al.
2018/0182562 A1*   6/2018  Alghamdi ............ H01G 9/2059

OTHER PUBLICATIONS

Yue Wang, et al., "Preparation of porous nanoparticle $TiO_2$ films for flexible dye-sensitized solar cells", Chinese Science Bulletin, vol. 56, No. 24, Aug. 2011, pp. 2649-2653.
Francesco Di Giacomo, et al., "Flexible Perovskite Photovoltaic Modules and Solar Cells Based on Atomic Layer Deposited Compact Layers and UV-Irradiated $TiO_2$ Scaffolds on Plastic Substrates" Advanced Energy Materials, vol. 5, 2015, pages 1-9.
Lev Matoh, et al., "A novel method for preparation of a platinum catalyst at low temperatures", Journal of Materials Chemistry A, RSC Publishing, vol. 1, 2013, pp. 1065-1069.

* cited by examiner

FABRICATION OF PLATINUM COUNTER ELECTRODES FOR BIFACIAL DYE-SENSITIZED SOLAR CELLS

CROSS REFERENCE TO RELATED APPLICATIONS

This application claims the benefit of priority from U.S. Provisional Application No. 62/654,033 filed Apr. 6, 2018, which is incorporated herein by reference in its entirety.

STATEMENT OF ACKNOWLEDGEMENT

The inventors are thankful to King Fahd University of Petroleum & Minerals (KFUPM) and Center for Excellence in Nanotechnology (CENT), KFUPM, Saudi Arabia for support of this research.

BACKGROUND OF THE INVENTION

Technical Field

The present invention relates to a method of making a platinum counter electrode for a flexible bifacial dye-sensitized solar cell.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third generation solar cells such as dye-sensitized solar cells (DSSCs), quantum-dots sensitized solar cells (QDSSCs), and recently perovskite solar cells (PSCs) have generated enormous research interest as they are expected to ultimately rival and possibly replace silicon solar cells in the pursuit of renewable and clean energy utilizing the abundant energy of the sun. The research interests attracted by these third generation solar cells are due to their solution processing capabilities, low costs, easy fabrication techniques, efficient performance, and potential for application in flexible devices. See Yun, S., Hagfeldt, A. & Ma, T. Pt-free counter electrode for dye-sensitized solar cells with high efficiency. *Adv. Mater.* 26, 6210-6237 (2014); QDSSCs Review Elsevier.pdf.; Duan, J., Zhang, H., Tang, Q., He, B. & Yu, L. Recent advances in critical materials for quantum dot-sensitized solar cells: a review. *J. Mater. Chem. A* 3, 17497-17510 (2015); Docampo, P., Ball, J. M., Darwich, M., Eperon, G. E. & Snaith, H. J. polymer substrates. *Nat. Commun.* 4, 1-6 (2013); and Giacomo, F. Di et al. Flexible Perovskite Photovoltaic Modules and Solar Cells Based on Atomic Layer Deposited Compact Layers and UV-Irradiated TiO$_2$ Scaffolds on Plastic Substrates. 1-9 (2015). doi: 10.1002/aenm.201401808, each incorporated herein by reference in their entirety. Since the work of Gratzel in 1991, various components of DSSCs such as the substrates, photoanodes, sensitizers (dyes), electrolytes, and counter electrodes (CEs) have continued to be researched for new materials, synthesis methods, and fabrication techniques. See Oregan, B. & Gratzel, M. a Low-Cost, High-Efficiency Solar-Cell Based on Dye-Sensitized Colloidal TiO$_2$ Films. *Nature* 353, 737-740 (1991), incorporated herein by reference in its entirety. N-type photoanodes with molecularly engineered dye have reached a record power conversion efficiency (PCE) of 13%. See Mathew, S. et al. Dye-sensitized solar cells with 13% efficiency achieved through the molecular engineering of porphyrin sensitizers. *Nat. Chem.* 6, 242-247 (2014), incorporated herein by reference in its entirety. TiO$_2$ remains the most commonly used n-type semiconducting photoanode. See Mathew, S. et al.; Lee, K. M. et al. Dye-sensitized solar cells with a micro-porous TiO$_2$ electrode and gel polymer electrolytes prepared by in situ cross-link reaction. *Sol. Energy Mater. Sol. Cells* 93, 2003-2007 (2009); Opara Krašovec, U., Berginc, M., Hočevar, M. & Topič, M. Unique TiO$_2$ paste for high efficiency dye-sensitized solar cells. *Sol. Energy Mater. Sol. Cells* 93, 379-381 (2009); So, S., Hwang, I. & Schmuki, P. Hierarchical DSSC structures based on 'single walled' TiO$_2$ nanotube arrays reach a back-side illumination solar light conversion efficiency of 8%. *Energy Environ. Sci.* 8, 849-854 (2015); Performance enhancement of dye-sensitized solar cells based TiO$_2$ thick mesoporous photoanodes by morphological manipulation. (2015); and TiO$_2$ low index, each incorporated herein by reference in their entirety. ZnO, photoactive doped metal oxides, and various nanocomposite materials have been reported as photoanodes in DSSCs. See Alpuche-Aviles, M. A. & Wu, Y. Photoelectrochemical Study of the Band Structure of Zn$_2$SnO$_4$ Prepared by the Hydrothermal Method. *J. Am. Chem. Soc.* 131, 3216-3224 (2009); Han, B. S. et al. Room Temperature Deposition of Crystalline Nanoporous ZnO Nanostructures for Direct Use as Flexible DSSC Photoanode. *Nanoscale Res. Lett.* 11, 221 (2016); and Thapa, A. et al. TiO$_2$ coated urchin-like SnO$_2$ microspheres for efficient dye-sensitized solar cells. *Nano Res.* 7, 1154-1163 (2014), each incorporated herein by reference in their entirety. Ruthenium (Ru) based sensitizers such as N3 and N719, among others, have become the de facto dye materials for DSSCs. See Jo, Y. et al. A novel dye coating method for N719 dye-sensitized solar cells. *Electrochim. Acta* 66, 121-125 (2012), incorporated herein by reference in its entirety. Liquid electrolytes are usually comprised of iodide/triiodide ($I^-/I^{3-}$) and cobalt complex ($Co^{2+}/Co^{3+}$) redox couples. See Bella, F., Galliano, S., Gerbaldi, C. & Viscardi, G. Cobalt-based electrolytes for dye-sensitized solar cells: Recent advances towards stable devices. *Energies* 9, 1-22 (2016); and Wu. J. el al. Electrolytes in dye-sensitized solar cells. *Chem. Rev.* 115, 2136-2173 (2015), each incorporated herein by reference in their entirety. Highly-electrocatalytic materials like platinum (Pt) are used to reduce $I^{3-}$ to $I^-$ at the CE surface in order to sustain the flow of current and regenerate molecules of the oxidized sensitizer in DSSC devices. See Li, L.-L., Wu, H.-H., Tsai, C.-H. & Wei-Guang Diau, E. Nanofabrication of uniform and stabilizer-free self-assembled platinum monolayers as counter electrodes for dye-sensitized solar cells. *NPG Asia Mater.* 6, e118 (2014); and Hsieh, T. Y. et al. A room-temperature process for fabricating a nano-Pt counter electrode on a plastic substrate for efficient dye-sensitized cells. *J. Power Sources* 283, 351-357 (2015), each incorporated herein by reference in their entirety.

The CE is a focal point of research for the improvement and advancement of DSSCs. Various efforts have investigated other non-platinum electrocatalytic materials as well as new techniques for the fabrication of Pt CE. See Yun, S., Hagfeldt, incorporated herein by reference in its entirety. Some of the alternative materials that have been investigated and reported include polymeric conducting materials such as poly(3,4-ethylenedioxy-thiophene):poly(styrenesulfonate) (PEDOT:PSS), carbon materials such as carbon soot, graphene, carbon nanotube (CNT), carbon nanofiber (CNF) and graphite, inorganic semiconducting chalcogenide compounds such as NiS, CoS, and CoSe, platinic composite materials, and other electrocatalytic composite materials. See Yun, S., Hagfeldt; Anothumakkool, B. et al. Pt- and TCO-Free Flexible Cathode for DSSC from Highly Conducting and Flexible PEDOT Paper Prepared via in Situ Interfacial Polymerization. *ACS Appl. Mater. Interfaces* 8, 553-562 (2016); Zhao, X. et al. A novel hierarchical Pt- and FTO-free counter electrode for dye-sensitized solar cell. *Nanoscale Res. Lett.* 9, 202 (2014); Yue, G. et al. A dye-sensitized solar cell based on PEDOT:PSS counter electrode. *Chinese Sci. Bull.* 58, 559-566 (2013); Wei, W., Wang, H. & Hu, Y. H. A review on PEDOT-based counter electrodes for dye-sensitized solar cells. *Int. J. Energy Res.* 38, 1099-1111 (2014); Ali, A. et al. Flexible, Low Cost, and Platinum-Free Counter Electrode for Efficient Dye-Sensitized Solar Cells. *ACS Appl. Mater. Interfaces* 8, 25353-25360 (2016); Ali, I., Chul, K., Ayoub, A., Bilal, M. & Hoon, S. Graphene coated cotton fabric as textile structured counter electrode for DSSC. *Electrochim. Acta* 173, 164-171 (2015); Choi, H., Kim, H., Hwang, S., Han, Y. & Jeon, M. Graphene counter electrodes for dye-sensitized solar cells prepared by electrophoretic deposition. *J. Mater. Chem.* 21, 7548-7551 (2011); Fu, L. & Yu, a M. Carbon Nanotubes Based Thin Films: Fabrication, Characterization and Applications. *Rev. Adv. Mater. Sci* 36, 40-61 (2014); Hsu, S.-H. et al. Platinum-Free Counter Electrode Comprised of Metal-Organic-Framework (MOF)-Derived Cobalt Sulfide Nanoparticles for Efficient Dye-Sensitized Solar Cells (DSSCs). *Sci. Rep.* 4, 6983 (2014); Chen, H. Y. et al. Highly catalytic carbon nanotube/Pt nanohybrid-based transparent counter electrode for efficient dye-sensitized solar cells. *Chem.—An Asian J.* 7, 1795-1802 (2012); Yue, G. et al. A highly efficient flexible dye-sensitized solar cell based on nickel sulfide/platinum/titanium counter electrode. *Nanoscale Res. Lett.* 10, 1 (2015); Lee, C. P. et al. Economical low-light photovoltaics by using the Pt-free dye-sensitized solar cell with graphene dot/PEDOT: PSS counter electrodes. *Nano Energy* 18, 109-117 (2015); and Li, C. T., Lee, C. P., Li, Y. Y., Yeh, M. H. & Ho, K. C. A composite film of $TiS_2$/PEDOT:PSS as the electrocatalyst for the counter electrode in dye-sensitized solar cells. *J. Mater. Chem. A* 1, 14888-14896 (2013), each incorporated herein by reference in their entirety. Polymeric conducting materials and carbon materials have the advantages of low costs, solution processing, and a low temperature fabrication requirement. However, Pt has consistently shown excellent electrocatalytic performance and holds the record of the highest PCE for DSSCs. See Li, L.-L. et al. incorporated herein by reference in its entirety. Pt CEs are usually fabricated at an elevated temperature of 450° C. from platinic acid ($H_2PtCl_6$) precursor or vacuum sputtered from a Pt target. See Lan, Z., Wu, J., Lin, J. & Huang, M. Morphology controllable fabrication of Pt counter electrodes for highly efficient dye-sensitized solar cells. *J. Mater. Chem.* 22, 3948 (2012); Moraes, R. S., Saito, E., Leite, D. M. G., Massi, M. & da Silva Sobrinho, A. S. Optical, electrical and electrochemical evaluation of sputtered platinum counter electrodes for dye-sensitized solar cells. *Appl. Surf. Sci.* 364, 229-234 (2016); and Iefanova, A. el al. Low Cost Platinum Counter Electrode for Dye-Sensitized Solar Cells. 2716-2719 (2013), each incorporated herein by reference in their entirety. Thermal decomposition of $H_2PtCl_6$ for the fabrication of Pt CE is not suitable for material with lower thermal stability at the required elevated temperature for the synthesis of Pt. Hence, flexible Pt CE on conductive polyethylene naphtholate (PEN), polyethylene terephthalate (PET), and textiles cannot be achieved through a thermal decomposition process. See Li, L.-L. et al; Hsieh, T. Y. et al.; and Gong, Y. et al. Simple Method for Manufacturing Pt Counter Electrodes on Conductive Plastic Substrates for Dye-Sensitized Solar Cells. *ACS Appl. Mater. Interfaces* 5, 795-800 (2013), each incorporated herein by reference in their entirety. Sputtering deposition, on the other hand, results in wastage of material during deposition process, which limits its use for large scale production as it is not cost effective. See Li, L.-L. et al; Hsieh, T. Y. et al.; and Gong, Y. et al, each incorporated herein by reference in their entirety.

Researchers have reported several attempts at fabricating Pt CEs at low temperature. Electrodeposition technique is one of such methods employed in the fabrication of Pt CEs at low temperature. This method, which takes place at room temperature, involves three electrodes configured with a transparent conductive oxide (TCO) substrate acting as the working electrode and with the electrolyte solution containing platinic acid. See Zhang, D., Chang, W. C., Okajima, T. & Ohsaka, T. Electrodeposition of platinum nanoparticles in a room-temperature ionic liquid. *Langmuir* 27, 14662-8 (2011); Zhang, L., Fang, Z., Zhao, G. C. & Wei, X. W. Electrodeposited platinum nanoparticles on the multi-walled carbon nanotubes and its electrocatalytic for nitric oxide. *Int. J. Electrochem. Sci.* 3, 746-754 (2008); and Domínguez-Domínguez, S., Arias-Pardilla, J., Berenguer-Murcia, Á., Morallón, E. & Cazorla-Amorós, D. Electrochemical deposition of platinum nanoparticles on different carbon supports and conducting polymers. *J. Appl. Electrochem.* 38, 259-268 (2008), each incorporated herein by reference in their entirety. A cyclic voltammetry process is then performed using an electrochemical system. Electrophoretic deposition was used by Yin et al., who prepared a $H_2PtCl_6$ glycol solution and preheated it under stirring for 6 h in an atmosphere of argon. ITO-PEN substrates were immersed in the resulting Pt-colloid and driven by a D.C. field of 1.6 $V \cdot cm^{-1}$. The Pt coated electrode was washed with deionized (DI) water and ethanol before being post thermally treated at 60° C. for 30 min. See Yin, X., Xue, Z. & Liu, B. Electrophoretic deposition of Pt nanoparticles on plastic substrates as counter electrode for flexible dye-sensitized solar cells. *J. Power Sources* 196, 2422-2426 (2011), incorporated herein by reference in its entirety. However, both electrodeposition and electrophoretic deposition methods have the shortcoming of large Pt loading in the electrochemical baths making them unfeasible for commercial production.

Some other alternative methods have however been reported. Chemical wet-chemistry reduction has been utilized for the fabrication of Pt CEs from $H_2PtCl_6$, employing acidic reducing agents without subsequent treatment. Matoh et al. employed a chemical reduction method with prepared $H_2PtCl_6$ in ethanol for the synthesis of nanostructured metallic Pt. See Matoh, L., Kozjek Škofic, I., Čeh, M. & Bukovec, N. A novel method for preparation of a platinum catalyst at low temperatures. *J. Mater. Chem. A* 1, 1065 (2013), incorporated herein by reference in its entirety. The ethanolic Pt precursor was either spin-coated or drop-coated on fluorine doped tin oxide (FTO) glass electrodes or indium doped tin oxide (ITO) PET flexible substrates and dried at room temperature. The coated surfaces were then treated with a gaseous formic acid reducing agent at a temperature of 100° C. for a period of 15 minutes.

In another example, Hseih et al. used a modified chemical reduction method to fabricate Pt CEs. See Hsieh, T. Y. et al., incorporated herein by reference in its entirety. Polyvinylpyrrolidone (PVP) served as surfactant, $NaHBr_4$ as a reducing agent, and NaOH was used to achieve a neutral platinic precursor. UV-ozone treatment was used to decompose the surfactant after deposition on FTO or ITO-PEN. Polyol reduction technique is a facile method of synthesis of Pt from $H_2PtCl_6$ whereby ethylene glycol (EG) is used as a reducing agent. Mei et al. fabricated Pt CEs using EG solution of $H_2PtCl_6.6H_2O$. See Mei, X.-G., Fan, B.-H., Sun, K. & Ouyang, J.-Y. High-performance dye-sensitized solar cells with nanomaterials as counter electrode. Proc. SPIE 7411, 74110A/1-74110A/9 (2009), incorporated herein by reference in its entirety. The deposited precursor was thermally treated at 180° C. The synthesized Pt on the substrates exhibited dense and porous Pt structures. The earlier resulted from growth of Pt on the substrates following the reduction, while the latter is due to Pt nanoparticle precipitation.

In another example, Li et al. used a similar polyol method with modification of the pH of the $H_2PtCl_6$ and with preheating the precursor solution at 110° C. for 30 mins. See Li, L.-L. et al., incorporated herein by reference in its entirety. They also pretreated the substrates with 'piranha' solution and 3-mercaptopropyl(trimethoxysilane) (MPTMS) to produce a thiol-functionalized silane self-assembled monolayer (SAM) film on the conductive substrates. The as-prepared functionalized substrates were soaked in the platinic EG solution for 12 h and rinsed with ethanol to eliminate undesirable residues and dried in a nitrogen environment.

Moreover, the high transmittances recorded for the photofabricated Pt CEs make them suitable for use in bifacial DSSCs. Bifacial DSSCs can be deployed as building windows and integrated electronic devices. See Carretero-palacios, S. et al. In Situ Prepared Transparent Polyaniline Electrode and Its Application in Bifacial. 1953-1961 (2016). doi:10.1039/C5TA10091G, incorporated herein by reference in its entirety.

In view of the forgoing, one objective of the present invention is to provide a method of fabricating a flexible bifacial dye-sensitized solar cell.

BRIEF SUMMARY OF THE INVENTION

According to a first aspect, the present disclosure relates to a method of fabricating a flexible bifacial dye-sensitized solar cell. The method involves a step of depositing a solution comprising a platinum precursor and an alcohol onto a first conductive layer of a first flexible substrate to produce a coated substrate. Then, the coated substrate is irradiated with a UV lamp to form crystalline platinum nanoparticles on the first substrate, thereby forming a flexible Pt counter electrode. Then, a metal oxide is separately applied on a second conductive layer of a second flexible substrate to form a metal oxide coated substrate. This metal oxide coated substrate comprises metal oxide particles on the second conductive layer of the second substrate. Then, a dye is deposited on the metal oxide particles, which forms a flexible photoanode. Finally, an electrolyte is sandwiched between the flexible Pt counter electrode and the flexible photoanode, thereby fabricating the flexible bifacial dye-sensitized solar cell. Within the flexible bifacial dye-sensitized solar cell, the electrolyte forms a first electrical contact to the dye and to the metal oxide particles of the photoanode, and the electrolyte forms a second electrical contact to the platinum nanoparticles of the flexible Pt counter electrode.

In one embodiment of the method, the Pt nanoparticles have an average diameter of 100-450 nm.

In one embodiment of the method, the Pt nanoparticles have a granular shape.

In one embodiment of the method, the platinum precursor is $H_2PtCl_6$, $H_2PtCl_4$, $(NH_4)_2PtCl_6$, or $K_2PtCl_6$.

In one embodiment of the method, the alcohol has a boiling point of 83° C. or lower at atmospheric pressure.

In a further embodiment, the alcohol is methanol, ethanol, or isopropanol.

In one embodiment of the method, the solution is deposited by dropping the solution onto the first conductive layer.

In one embodiment of the method, the first conductive layer and the second conductive layer are transparent and are each independently selected from the group consisting of ITO, FTO, AZO, GZO, IZO, IZTO, IAZO, IGZO, IGTO, and ATO.

In one embodiment of the method, wherein the irradiating is done for a period of 45-75 minutes and at an average intensity of $0.1$-$10$ $W \cdot cm^{-2}$.

In one embodiment of the method, the first flexible substrate and the second flexible substrate each independently comprise a plastic selected from the group consisting of poly(ethylene terephthalate), poly(ethylene naphthalate), polycarbonate, polypropylene, polyimide, triacetyl cellulose, polyethersulfone, cyclo olefin copolymer, and polyarylite.

In one embodiment of the method, the irradiating does not raise a surface temperature of the first flexible substrate above 50° C.

In a further embodiment, the irradiating does not raise a surface temperature of the first flexible substrate above 40° C.

In one embodiment of the method, the electrolyte comprises iodide.

In one embodiment of the method, the metal oxide is at least one selected from the group consisting of ZnO, $TiO_2$, SnO, $Fe_2O_3$, $WO_3$, $CeO_2$, $BiVO_4$, $SrTiO_3$, and $BaTiO_3$.

In one embodiment of the method, the metal oxide is ZnO.

In one embodiment of the method, the metal oxide is applied in the form of a paste which is heated at a temperature of 100-150° C. to form the metal oxide coated substrate.

In a further embodiment, the paste comprises butanol.

In one embodiment of the method, the flexible bifacial dye-sensitized solar cell has a percentage ratio of rear illumination efficiency to front illumination efficiency of 45-95%.

In one embodiment of the method, the flexible bifacial dye-sensitized solar cell under AM1.5 irradiation applied as front or rear illumination has an open circuit voltage in a range of 0.4-1.0 V.

In one embodiment of the method, the flexible bifacial dye-sensitized solar cell under AM1.5 irradiation applied as front illumination has a short circuit density of 5.0-17.0 $mA/cm^2$.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
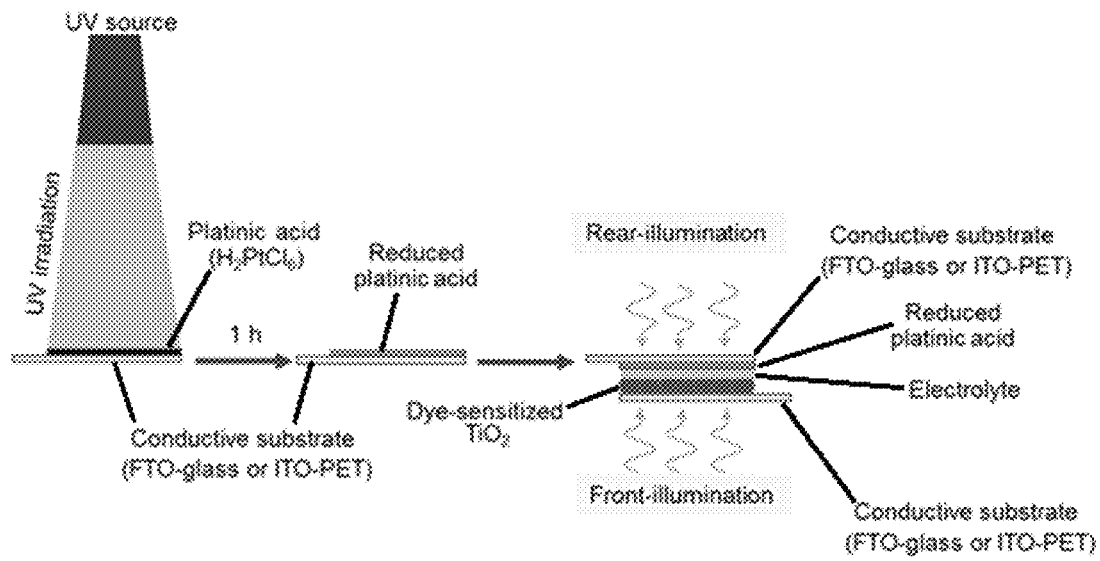
FIG. 1A is a schematic showing a photofabriation process and the assembled DSSC, with directions of front and rear illumination.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

For polygonal shapes, the term "diameter," as used herein, and unless otherwise specified, refers to the greatest possible distance measured from a vertex of a polygon through the center of the face to the vertex on the opposite side. For a circle, an oval, and an ellipse, "diameter" refers to the greatest possible distance measured from one point on the shape through the center of the shape to a point directly across from it.

The present disclosure is intended to include all hydration states of a given compound or formula, unless otherwise noted or when heating a material. For example, $H_2PtCl_6 \cdot 6H_2O$ includes anhydrous $H_2PtCl_6$, $[H_3O]_2[PtCl_6](H_2O)_x$, $H_2PtCl_6 \cdot 6H_2O$, and any other hydrated forms or mixtures.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of zinc include $^{64}Zn$, $^{66}Zn$, $^{67}Zn$, $^{68}Zn$, and $^{70}Zn$. Isotopes of platinum include $^{190}Pt$, $^{192}Pt$, $^{193}Pt$, $^{194}Pt$, $^{195}Pt$, $^{196}Pt$, and $^{198}Pt$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present application relates to a method of fabricating a flexible bifacial dye-sensitized solar cell. A dye-sensitized solar cell (DSSC) refers to an electrical device that converts the energy of light directly into electricity (i.e. a photoelectric conversion mechanism) by a photovoltaic effect. A dye-sensitized solar cell mainly includes a transparent substrate (or anode), a semiconductor layer, a photo-sensitizing dye, an electrolyte, and a counter electrode (or cathode). A flexible anode and counter electrode may enable the DSSC to be flexible. The photoelectric conversion mechanism thereof is as follows. When sunlight reaches the DSSC, the dye molecules absorb energy from sunlight, and electrons in the dye molecules are excited and transit to an excited state. The electrons in the excited state are rapidly injected into a conduction band of the semiconductor layer, and thus the dye molecules are transformed to an oxidized state due to a loss of electrons. The electrons injected into the conduction band of the semiconductor layer, instantly reach a contact interface between the semiconductor layer and the transparent substrate of the anode, accumulate on the anode, and flow to the counter electrode (or cathode) through an outer circuit including a load. The dye molecules in the oxidized state accept electrons from an electron donor in the electrolyte and return to the ground state, thereby regenerating the dye molecules. After losing its electron, the electron donor in the electrolyte diffuses to the counter electrode and accepts an electron and is reduced. In this way, a photoelectric chemical reaction cycle is completed. The counter electrode is mainly used for collecting electrons and accelerating the electron exchange rate between the electrolyte and counter electrode.

With a transparent cathode, bifacial solar cells can absorb light from both the front and rear sides. Hence, they may produce more electricity than conventional monofacial solar cells. As used herein, the flexible bifacial dye-sensitized solar cell may also be called a "flexible dye-sensitized solar cell" or a "flexible DSSC," with the understanding that the solar cell is bifacial unless noted otherwise. As defined here, the front illumination refers to light that is incident on the front side, or photoanode side of the DSSC. Rear illumination refers to light incident on the rear side, or counter electrode side. Rear illumination generally produces less power than front illumination, as rear-illuminated light has to pass through the electrolyte before being absorbed by dye.

As described more fully herein, the method of fabricating the flexible DSSC involves a step of depositing a solution comprising a platinum precursor and an alcohol onto a first conductive layer of a first flexible substrate to produce a coated substrate. Then, the coated substrate is irradiated with a UV lamp to form crystalline platinum nanoparticles on the first substrate, thereby forming a flexible Pt counter electrode. Then, a metal oxide is separately applied on a second conductive layer of a second flexible substrate to form a metal oxide coated substrate. This metal oxide coated substrate comprises metal oxide particles on the second conductive layer of the second substrate. Then, a dye is deposited on the metal oxide particles, which forms a flexible photoanode. Finally, an electrolyte is sandwiched between the flexible Pt counter electrode and the flexible photoanode, thereby fabricating the flexible bifacial dye-sensitized solar cell. Within the flexible bifacial dye-sensitized solar cell, the electrolyte forms a first electrical contact to the dye and to the metal oxide particles of the photoanode, and the electrolyte forms a second electrical contact to the platinum nanoparticles of the flexible Pt counter electrode.

In one embodiment, the first flexible substrate and the second flexible substrate may each independently comprise a plastic selected from the group consisting of polyethylene (PE), poly(ethylene terephthalate) (PET), poly(ethylene naphthalate) (PEN), polycarbonate (PC), polypropylene (PP), polyacrylate, poly methyl methacrylate (PMMA), polystyrene (PS), polyimide (PI), triacetyl cellulose (TAC), polyethersulfone, polybutylene terephthalate, cyclo olefin copolymer (COC), and polyarylite. Where the plastic is polyethylene, the polyethylene may be ultra-high-molecular-weight polyethylene (UHMWPE), ultra-low-molecular-weight polyethylene (ULMWPE), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE), or chlorinated polyethylene (CPE). In some embodiments, combinations of two or more plastics may be used, or the plastics may comprise one of the types mentioned above with the addition of co-polymers such as alpha-olefins, vinyl acetate, or acrylate. Preferably the plastic is PEN, PET, or PP, more preferably the plastic is PET. In one embodiment, the first and second flexible substrates comprise the same plastic, though in other embodiments, they may each comprise a different plastic.

The first and/or second flexible substrate may have a thickness of 0.1-4 mm, preferably 0.5-3 mm, more preferably 0.8-2 mm. A face of the first and/or second flexible substrate may have an area of 0.1-2,500 $cm^2$, preferably 0.25-100 cm², more preferably 3.5-36 cm², and may have an aspect ratio (length:width) in a range of 10:1-1:1 preferably 4:1-1:1, more preferably 2:1-1:1. Preferably the first and second flexible substrates have similar areas and similar aspect ratios. Preferably the first and second flexible substrates are rectangular, though in alternative embodiments the substrates may be circular, elliptical, rounded, triangular, a non-rectangle quadrilateral, or some other regular or irregular shape.

As defined here, a substrate being "flexible" means that the substrate may be reversibly deformed against a cylindrical surface having a curvature, κ, of up to 0.1 cm$^{-1}$, preferably up to 0.25 cm$^{-1}$, more preferably up to 0.5 cm$^{-1}$, even more preferably up to 1 cm$^{-1}$ without causing stress fracture or permanent deformation. By definition, a curve with a curvature of κ has a radius of curvature of 1/κ. In some embodiments, the substrate may be deformed with a curvature of more than 1 cm$^{-1}$, for instance, 1.1-1.5 cm$^{-1}$, or 1.6-2.0 cm$^{-1}$, without causing fracture or permanent deformation. The flexible bifacial dye-sensitized solar cell being flexible means that it can be deformed with a similar curvature as for the substrate without a loss in function or permanent deformation after being returned to its original shape. For instance, the flexible bifacial dye-sensitized solar cell may be deformed as described without a loss of conversion efficiency and without the solar cell leaking the electrolyte. Generally, thinner flexible substrates may be reversibly deformed along a greater curvature than thicker flexible substrates comprising the same material.

In an alternative embodiment, a transparent rigid substrate may be used, where the substrate may comprise plastic, glass, or quartz. Where the substrate comprises glass, the glass may be boro-aluminosilicate glass, sodium borosilicate glass, fused-silica glass, soda lime glass, or some other type of glass.

Figure 9A:
FIG. 9A shows a photograph of a typical transparent photofabricated Pt CE.

In one embodiment, the first conductive layer and the second conductive layer are transparent, so that the first flexible substrate and second flexible substrate are each transparent. As used herein, a material being "transparent" is defined as having an average transmittance of 85-100% over a wavelength range of 400-700 nm. Alternatively, a material being transparent may have a transmittance of 90-100% over a wavelength range of 400-700 nm. For a flat substrate, this transmittance is of a light path that intersects the two largest faces of the substrate. FIG. 9A shows an example of flexible substrates being transparent against a background of printed text. In an alternative embodiment, at least one of the flexible substrates or conductive layers may be doped or coated with a UV sensitizer dye.

In one embodiment, the conductive layers are transparent each independently selected from the group consisting of ITO (indium tin oxide), FTO (fluorine-doped tin oxide), AZO (aluminum-doped zinc oxide), GZO (gallium-doped zinc oxide), IZO (indium zinc oxide), IZTO (indium zinc tin oxide), IAZO (indium aluminum zinc oxide), IGZO (indium gallium zinc oxide), IGTO (indium gallium tin oxide), and ATO (antimony tin oxide). These layers may be known as transparent conductive films, and in other embodiments, transparent conducting polymers (such as PEDOT) or carbon nanotubes may be used with or in place of the compounds previously mentioned. Preferably the conductive layers are both ITO or both FTO, and in a preferred embodiment, both conductive layers are ITO.

Indium tin oxide (ITO) is a ternary composition of indium, tin, and oxygen. Depending on the oxygen content, it can either be described as a ceramic or alloy. Indium tin oxide, such as that of the present disclosure, is usually encountered as an oxygen-saturated composition with a formulation of 74 wt % In, 18 wt % O$_2$, and 8 wt % Sn, each relative to a total weight of the composition. In terms of SnO$_2$ and In$_2$O$_3$, this composition is equivalent to and may be represented as 10 wt % SnO$_2$ and 90 wt % In$_2$O$_3$, both relative to a total weight of the composition. ITO is transparent and colorless in thin layers, while in bulk form it is yellowish to grey. In the infrared region of the spectrum it acts as a metal-like mirror. Oxygen unsaturated compositions are less common and are termed oxygen-deficient ITO. In other embodiments, the ITO of the present disclosure may comprise oxygen-deficient ITO, or ITO having compositions of In, O, and/or Sn that are different than those in the oxygen-saturated composition. Preferably the ITO of the present disclosure is substantially pure, meaning that the ITO comprises greater than 99.0 wt %, preferably greater than 99.5 wt %, preferably greater than 99.8 wt % of the combined weight of indium, tin, and oxide, relative to a total weight of the ITO. Similarly, preferably the conductive layers comprise greater than 99.0 wt % ITO, preferably greater than 99.5 wt % ITO, each relative to their total weight.

Indium tin oxide is one of the most widely used transparent conducting oxides because of its two main properties: its electrical conductivity and optical transparency, as well as the ease with which it can be deposited as a thin film. As with all transparent conducting films, a compromise must be made between conductivity and transparency, since increasing the thickness and increasing the concentration of charge carriers increases the material's conductivity, but decreases its transparency.

The conductive layers may be present as a film having an average thickness of 500 nm-200 μm, preferably 1 μm-100 μm, more preferably 10 μm-50 μm. However, in some embodiments, the conductive layers may have an average thickness of less than 500 nm. For instance, the conductive layers may have an average thickness of 50-500 nm, 80-300 nm, or 100-250 nm. Preferably, the conductive layers cover all of one side of each flexible substrate, or about 100% of the area of one side of each. However, in other embodiments, the area of a conductive layer may only be 10-90%, or 20-80% of the total area of the side of the flexible substrate. Here, the conductive layer may be rectangular or patterned in a different shape.

In one embodiment, a surface resistivity of either conductive layer may be 1-50 Ω/sq, preferably 4-25 Ω/sq, more preferably 5-20 Ω/sq. However, in some embodiments, the surface resistivity may be less than 1 Ω/sq or greater than 50 Ω/sq.

In one embodiment, either conductive layer may have an area in direct contact with an electrically-conductive material so that the flexible DSSC may form part of a circuit. An "electrically-conductive material" as defined here is a substance with an electrical resistivity of at most 10$^{-6}$ Ω·m, preferably at most 10$^{-7}$ Ω·m, more preferably at most 10$^{-8}$ Ω·m at a temperature of 20-25° C. The electrically-conductive material may be platinum-iridium alloy, iridium, titanium, titanium alloy, stainless steel, gold, cobalt alloy, copper, aluminum, tin, iron, and/or some other metal. In other embodiments, a part of a conductive layer may extend from the flexible substrate in order to be connected to an electrically-conductive material. An electrically-conductive material may be held in place by solder, a clip, a conductive adhesive, or some other means.

In one embodiment, the platinum precursor may be H$_2$PtCl$_6$, H$_2$PtCl$_4$, (NH$_4$)PtCl$_6$, and/or K$_2$PtCl$_6$. In a preferred embodiment, the platinum precursor is H$_2$PtCl$_6$, which is otherwise known as chloroplatinic acid, and may also be written as $[H_3O]_2[PtCl_6](H_2O)_x$. In other embodiments, different compounds comprising platinum may be used, for instance, $Pt(NH_3)_2(CO_2)_2C_4H_6$, $Pt(NH_3)_2Cl_2$, $K_2Pt(CN)_4$, $Pt(NH_3)_4PtCl_4$, $Pt(NH_3)_2CO_2CH_2O$, $C_6H_{10}(NH_2)_2PtC_2O_4$, $NH_3PtCl_2NC_5H_4CH_3$, $Pt(C_2H_3O_2)_2$, $PtBr_2$, $PtCl_2$, $K_2PtCl_4$, $(PtCl(NH_3)_2C_6H_{12}(NH_2)_2)Pt(NH_3)_2(NO_3)_4$, $Pt(OH)_2$, $PtS$, $PtCl_2C_8H_{12}$, $KPtCl_3C_2H_4$, $PtO_2$, $[Pt(NH_3)_4]Cl_2$, $H_2PtCl_6$, $PtBr_4$, $PtCl_4$, $PtF_4$, $K_2PtCl_6$, $Pt(C_2H_3O_2)_2Cl_2NH_3NH_2C_6H_{11}$, $Na_2PtCl_6$, $Pt(OH)_4$, $PtS_2$, $PtSe_2$, $XeFPtF_5$, $PtF_5$, $O_2PtF_6$, $XePtF_6$, or $PtF_6$. In an alternative embodiment, Pt nanoparticles may be deposited, for instance, as a paste or within a solvent, without a need for a photoreduction step.

In one embodiment, the solution comprising the platinum precursor and the alcohol is deposited onto the first conductive layer, in order to produce a coated substrate. This depositing may be done by dropping the solution. This method may be considered essentially equivalent to dripping the solution or applying one or more droplets of the solution. In some embodiments, this method may also be considered "drop casting." For example, a droplet of the needed volume may be formed on the tip of a volumetric pipette, and then contacted to and left on the surface of the first conductive layer to allow the solution to evaporate.

In other embodiments, the solution may be deposited onto the first conductive layer by contact printing, spin coating, blade spreading (which may also be called doctor blading or slot coating), screen printing, spray coating, ink jet printing, bar coating, dip coating, brushing, or immersing. The solution may be dropped onto the first conductive layer, and then spread. Where the solution is deposited by spin coating, the substrate may be rotated at a rate of 500-8,000 rpm, preferably 1,000-4,000 rpm, more preferably 1,500-2,500 rpm for 10-60 s, preferably 15-45 s, more preferably 20-40 s, and at a ramp rate of 100-800 rpm, preferably 200-600 rpm, or about 500 rpm. In embodiments where the solution comprises an alcohol or some solvent with a boiling point of 83° C. or lower at atmospheric pressure, such as ethanol, isopropanol, or methanol, dropping may be a more effective coating technique than spin coating. In alternative embodiments where the solution comprises an alcohol or some solvent with a boiling point greater than 83° C. at atmospheric pressure, the spin coating may provide a more efficient or homogenous coating of the solution than dropping. In some embodiments, a portion of the first conductive layer may be masked or covered, in order to limit the area of the first conductive layer being contacted.

The first conductive layer may be masked or temporarily covered with tape, a film, or a gasket so that only 5-90%, preferably 10-80%, more preferably 15-75% of the total area of the first conductive layer is exposed to the solution. In one embodiment, the tape may be SCOTCH tape by 3M. However, in other embodiments, the no part of the first conductive layer may be masked or covered, and about 100% of the total area of the conductive layer may be In other embodiments, the solvent may be an organic solvent selected from the group consisting of toluene, tetrahydrofuran, acetic acid, acetone, acetonitrile, butanol, dichloromethane, chloroform, chlorobenzene, dichloroethane, diethylene glycol, diethyl ether, dimethoxy-ethane, dimethyl-formamide, dimethyl sulfoxide, ethanol, ethyl acetate, ethylene glycol, heptane, hexamethylphosphoramide, hexamethylphosphorous triamide, methanol, methyl t-butyl ether, methylene chloride, pentane, cyclopentane, hexane, cyclohexane, benzene, dioxane, propanol, isopropyl alcohol, pyridine, triethyl amine, propandiol-1,2-carbonate, ethylene carbonate, propylene carbonate, nitrobenzene, formamide, γ-butyrolactone, benzyl alcohol, n-methyl-2-pyrrolidone, acetophenone, benzonitrile, valeronitrile, 3-methoxy propionitrile, dimethyl sulfate, aniline, n-methylformamide, phenol, 1,2-dichlorobenzene, tri-n-butyl phosphate, ethylene sulfate, benzenethiol, dimethyl acetamide, N,N-dimethylethaneamide, 3-methoxypropionnitrile, diglyme, cyclohexanol, bromobenzene, cyclohexanone, anisole, diethylformamide, 1-hexanethiol, ethyl chloroacetate, 1-dodecanthiol, di-n-butylether, dibutyl ether, acetic anhydride, m-xylene, o-xylene, p-xylene, morpholine, diisopropyl etheramine, diethyl carbonate, 1-pentandiol, n-butyl acetate, and 1-hexadecanthiol.

The solution may be deposited on the first conductive layer at a volume per area ratio of 10-300 µL/cm², preferably 15-200 µL/cm², more preferably 20-130 µL/cm². However, depending on the concentration of Pt and type of solvent, a volume per area ratio of smaller than 10 µL/cm² or greater than 300 µL/cm² may be used. For instance, a solution having a greater concentration of Pt from the Pt precursor may be applied at a smaller volume to a certain area than a solution having a lower concentration, and may result in similar first conductive layers after the solvent evaporates. The concentration of the Pt in the solution may be 0.001-1.0 M, preferably 0.010-0.100 M, more preferably 0.015-0.030 M. The solution may be applied at a layer thickness of 10-500 µm, preferably 20-400 µm, more preferably 30-300 µm. In one embodiment, the solution consists essentially of the Pt precursor and solvent. For instance, the solution may consist of only Pt and ethanol. In one embodiment, the solution does not contain a surfactant.

In some embodiments, the first conductive layer having the deposited solution may be left at room temperature for the solvent to evaporate, while in other embodiments, the first flexible substrate may be heated and/or placed in a desiccator. In other embodiments, rather than depositing a solution onto the first conductive layer, Pt nanoparticles may be directly deposited by a chemical vapor deposition method.

Following the deposition of the solution, the coated substrate is then irradiated with a UV lamp. Where the Pt precursor is chloroplatinic acid, or some other oxidized form of Pt, the Pt is photoreduced into Pt metal, preferably in the form of nanoparticles, which forms the flexible Pt counter electrode (CE). The coated substrate may be irradiated with the UV lamp before the solvent completely evaporates, or when the coated substrate is dry. The coated substrate may be exposed to UV irradiation from the UV lamp for 45-75 min, preferably 50-70 min, more preferably 55-65 min, and at an average intensity of 0.1-10 W·cm⁻², preferably 1.0-5 W·cm⁻², more preferably 1.5-4 W·cm⁻², or about 2 W·cm⁻². However, in some embodiments, the coated substrate may be irradiated for a longer time and at a lower intensity, or for a shorter time with a higher average intensity. However, in alternative embodiments, the coated substrate may be irradiated at a lower average intensity for a shorter time or at a higher intensity for a longer time. Preferably, the instantaneous irradiation power varies from the average irradiation power by less than 15%, preferably by less than 10%, more preferably by less than 5%. In one embodiment, the irradiating does not raise a surface temperature of the first flexible substrate above 50° C. Here, the coated substrate may not deform or become damaged from overheating, for instance, by melting or softening any plastic within the substrate Preferably, the irradiating does not raise a surface temperature of the first flexible substrate above 40° C. In another embodiment, the irradiating does not raise a surface temperature of the first flexible substrate above 38° C. Preferably, in these embodiments, the coated substrate is irradiated at room temperature (about 22-25° C.) and without forced air cooling. In an alternative embodiment, however, forced air cooling may be used during the irradiating.

The UV lamp may be a tube with, or preferably, without a phosphor coating. In another embodiment, the UV lamp may be an incandescent lamp, such as a halogen lamp with a fused quartz envelope. In another embodiment, the UV lamp may be a gas-discharge lamp, such as a xenon arc lamp, an argon arc lamp, a deuterium arc lamp, a mercury-xenon arc lamp, or a metal-halide arc lamp. The UV lamp may emit light in a wavelength range of 100-400 nm, preferably 200-400 nm. In other embodiments, the UV lamp may be an excimer lamp, or a UV source such as UV LEDs may be used instead of a lamp. In another embodiment, a broadband light source may be used with filters to select for light in the UV region. In one embodiment, the coated substrate is not irradiated with a laser. In an alternative embodiment, the coated substrate is irradiated with a laser, such as a UV laser. However, in some embodiments, the high, localized intensity of a UV layer may produce amorphous Pt nanoparticles. Thus, it may be preferred to irradiate using a UV lamp over a longer time period and at a lower localized intensity in order to enable the formation of crystalline Pt nanoparticles. In one embodiment, the irradiation of the UV lamp may have an average intensity that is substantially similar to its localized or instantaneous intensity on the coated substrate. This contrasts with a UV laser of high intensity which may be scanned across the coated substrate. A UV lamp also provides an advantage of even irradiation over large surfaces, for instance, if a large coated substrate is irradiated.

Where the flexible Pt counter electrode comprises Pt nanoparticles, in one embodiment, the nanoparticles have an average diameter or longest dimension of 100-450 nm, preferably 150-400 nm, more preferably 200-350 nm, more preferably 210-300 nm. However, in some embodiments, the nanoparticles may have an average diameter or longest dimension of less than 100 nm or greater than 450 nm.

Figure 2A:
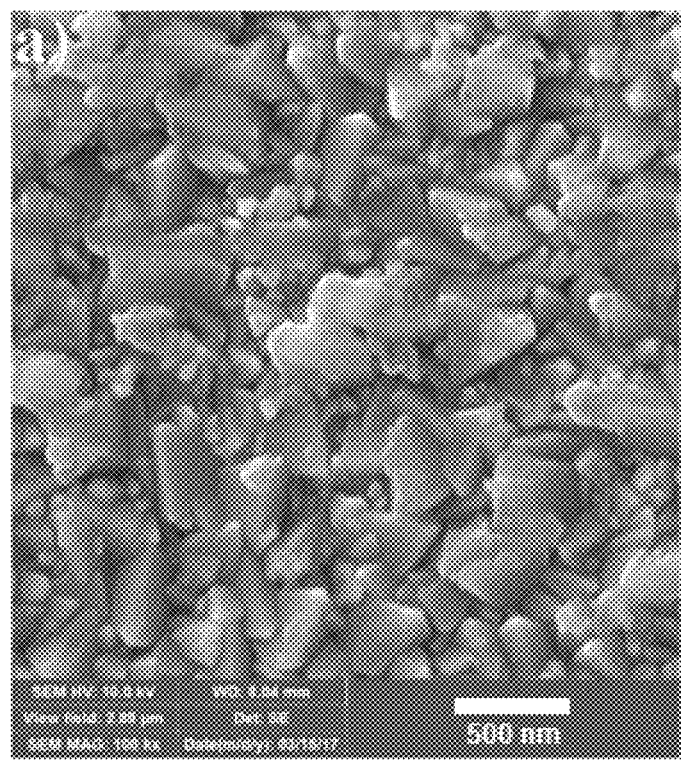
FIG. 2A is a scanning emission microscopy (SEM) image of a photofabricated Pt CE with 2 h UV irradiation time.

Preferably, the Pt nanoparticles have a granular shape, as opposed to a flat shape. For instance, the Pt nanoparticles of the SEM images in FIGS. 2B, 4A, 4B, and 5B are granular, while those of FIGS. 2A and 4C are flat. In one embodiment, the Pt nanoparticles may have a granular shape where the distance from the particle centroid (center of mass) to anywhere on the nanoparticle outer surface varies by less than 50%, preferably by less than 40% of the average distance. In one embodiment, the Pt nanoparticles may be more rounded or spherical, where the distance from the particle centroid to anywhere on the outer surface varies by less than 30%, preferably less than 20%, or less than 10%. In some embodiments, one or more Pt nanoparticles may be shaped like cylinders, boxes, spikes, flakes, plates, ellipsoids, toroids, stars, ribbons, discs, rods, granules, prisms, cones, flakes, platelets, sheets, or some other shape.

Figure 2B:
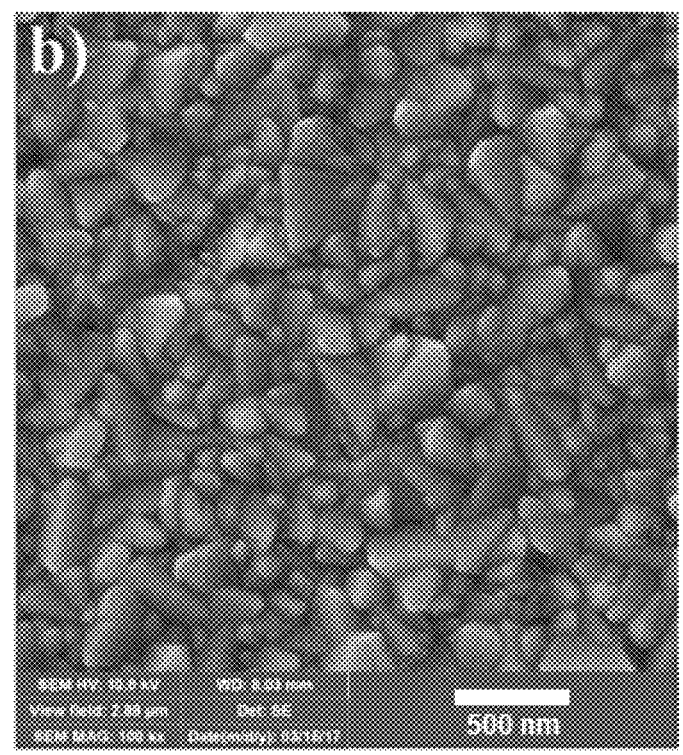
FIG. 2B is a SEM image of a photofabricated Pt CE with 1 h UV irradiation time.
Figure 4A:
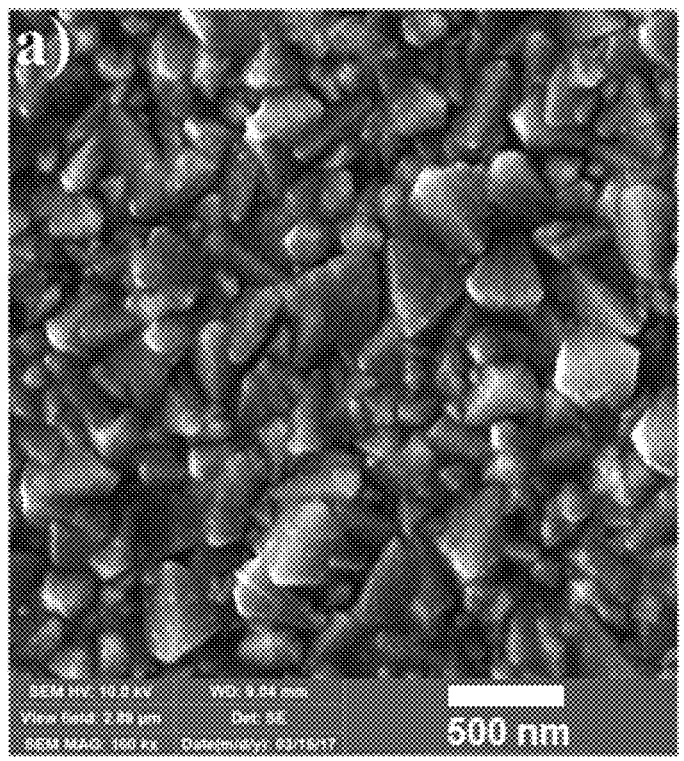
FIG. 4A is a scanning emission microscopy (SEM) image of a photofabricated Pt CE (Pt-EtOH-FTO) with 1 h UV irradiation time.
Figure 4B:
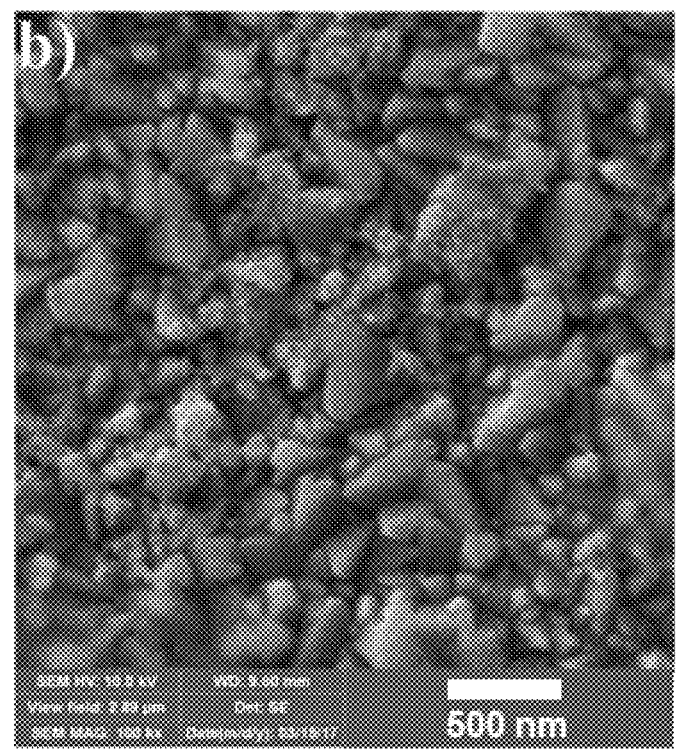
FIG. 4B is a SEM image of a photofabricated Pt CE (Pt-EtOH-FTO) with 30 min UV irradiation time.
Figure 4C:
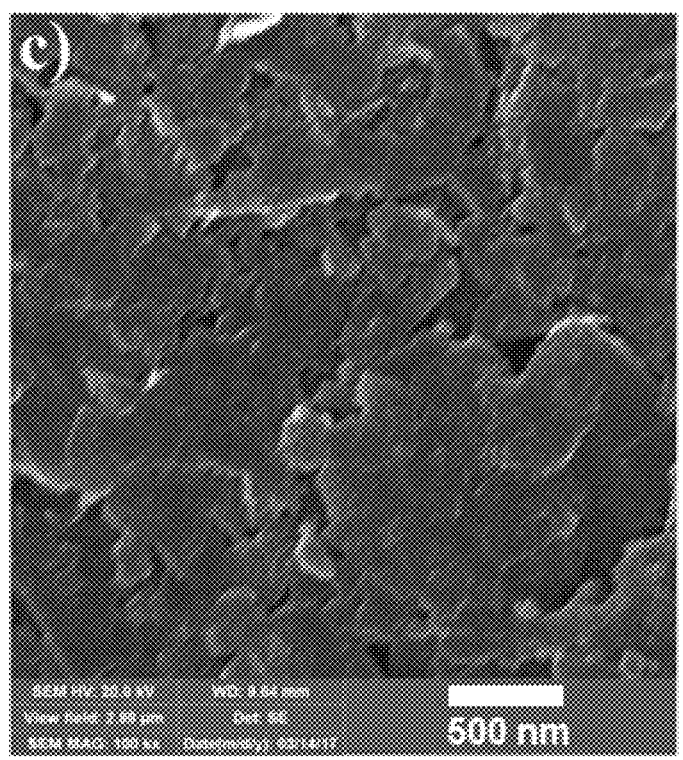
FIG. 4C is a SEM image of a photofabricated Pt CE (Pt-EtOH-FTO) with 15 min UV irradiation time.

Preferably, in one embodiment, the Pt nanoparticles are shaped as those shown in FIGS. 2B, 4A, 4B, and/or 5B. For instance, the Pt nanoparticles may have sharp edges of a length of 50-450 nm, preferably 100-400 nm, more preferably 120-300 nm, more preferably 140-300 nm. These sharp edges may each be formed by two planar surfaces of a Pt nanoparticle forming an angle of 30°-80°, preferably 35°-75°, more preferably 45°-65°. In one embodiment, increasing the length of UV irradiation time increases the occurrence of this particle morphology over those of nanosheets or nanoflakes, such as the nanosheets and nanoflakes shown in FIGS. 2A and 4C.

In one embodiment, the Pt nanoparticles may have an average Wadell sphericity value in a range of 0.3 to 0.9, or 0.3 to 0.8. The Wadell sphericity of a particle is defined by the ratio of the surface area of a theoretical sphere (which has the same volume as the given particle) to the surface area of the particle. The values of Wadell sphericity range from 0 to 1, where a value of 1 is a perfect sphere, and particles become less spherical as their sphericity approaches a value of 0. The Wadell sphericity may be approximated by $$\Psi \approx \left(\frac{bc}{a^2}\right)^{1/3},$$

where a, b, and c are the lengths of the long, intermediate, and short axes, respectively, of an individual particle.

In one embodiment, the Pt nanoparticles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In a preferred embodiment, the Pt nanoparticles are monodisperse having a particle diameter distribution ranging from 80% of the average particle diameter to 120% of the average particle diameter, preferably 85-115%, preferably 90-110% of the average particle diameter. In another embodiment, the Pt nanoparticles are not monodisperse.

In one embodiment, the Pt nanoparticles may comprise Pt of a non-crystalline or amorphous phase. In this embodiment, the Pt nanoparticles may have a more rounded or more spherical geometry. This rounded or spherical geometry may be as described previously, where the distance from the particle centroid to anywhere on the outer surface varies by less than 30%, preferably less than 20%, or less than 10%. In one embodiment, non-crystalline or amorphous Pt nanoparticles may be present as agglomerates.

As mentioned, in one embodiment, the Pt nanoparticles may be present as agglomerates of primary particles. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the Pt nanoparticles having a mean diameter as previously described, or may have a smaller mean diameter, such as 40-200 nm, preferably 50-180 nm, or 55-170 nm. In one embodiment, the Pt nanoparticles may be round and agglomerated as those shown in FIG. 5B.

Preferably, the Pt nanoparticles in contact with the conductive layer form an electrically-conductive material with the conductive layer. An "electrically-conductive material" as defined here is a substance with an electrical resistivity of at most $10^{-6}$ $\Omega \cdot m$, preferably at most $10^{-7}$ $\Omega \cdot m$, more preferably at most $10^{-8}$ $\Omega \cdot m$ at a temperature of 20-25° C.

The method also involves applying a metal oxide on a second conductive layer of a second flexible substrate to form a metal oxide coated substrate. The metal oxide coated substrate comprises metal oxide particles on the second conductive layer of the second substrate. In one embodiment, the metal oxide is at least one selected from the group consisting of ZnO, $TiO_2$, SnO, $Fe_2O_3$, $WO_3$, $CeO_2$, $BiVO_4$, $SrTiO_3$, and $BaTiO_3$. In one embodiment, the metal oxide is ZnO, $TiO_2$, SnO, $Fe_2O_3$, $WO_3$, or $CeO_2$. In a preferred embodiment, the metal oxide is ZnO. In an alternative embodiment, a semiconductive material may be used in place of a metal oxide, such as GaN, GaAs, $MoS_2$, $WSe_2$, $MoSe_2$, doped silicon, an n-type semiconductor, or some other photocatalytically active compound. N-type semiconductors are created by doping an intrinsic semiconductor with an electron donor element. Group IV semiconductors use group V atoms as donors and group III atoms as acceptors. For group IV n-type semiconductors, the intrinsic semiconductor may comprise silicon or germanium, and the donor element may be phosphorus, arsenic, or antimony. Group III-V semiconductors, the compound semiconductors, use group VI atoms as donors and group II atoms as acceptors. Group III-V semiconductors can also use group IV atoms as either donors or acceptors. When a group IV atom replaces the group III element in the semiconductor lattice, the group IV atom acts as a donor. Conversely, when a group IV atom replaces the group V element, the group IV atom acts as an acceptor. Group IV atoms can act as both donors and acceptors; therefore, they are known as amphoteric impurities. For group III-V n-type semiconductors, the intrinsic semiconductor may comprise aluminum phosphide, aluminum arsenide, gallium arsenide, or gallium nitride, and the donor element may be selenium, tellurium, silicon, or germanium. Other metal oxides that may be used to form the metal oxide coated substrate include $Na_2Ti_6O_{13}$, $BaTi_4O_9$, $Ta_2O_5$, $KTaO_3$, $K_4Nb_6SO_{17}$, and $K_2La_2Ti_3O_{10}$.

In one embodiment, the metal oxide particles may have an average diameter or longest dimension of 20-750 nm, preferably 40-500 nm, more preferably 50-450 nm, even more preferably 55-100 nm. In another embodiment, the metal oxide particles may have an average diameter or longest dimension of 5-200 nm, preferably 10-150 nm, more preferably 15-100 nm, even more preferably 20-90 nm. The metal oxide particles may have geometries, dispersity, agglomerates, or other morphologies as mentioned previously for the Pt nanoparticles.

In one embodiment, the metal oxide particles may be applied in the form of a paste, and may also be called a slurry or colloidal mixture. The paste may have a viscosity of 10 to 8,000 cps (centipoises), preferably 100-8,000 cps, more preferably 1,000-8,000 cps. The paste may comprise the metal oxide in a solvent at a concentration of 0.1-5.5 g/mL, preferably 0.5-3 g/mL, more preferably 0.6-2.0 g/mL. In one embodiment, the solvent is n-butanol, but in other embodiments, the solvent may be an organic solvent as any of those mentioned previously. In one embodiment, the paste may be applied to the conductive layer to form a layer with a thickness of 10-500 μm, preferably 30-400 μm, more preferably 40-100 μm. The applying may be by doctor blading, spreading, or some other application technique previously mentioned. In alternative embodiments, the paste may also comprise a plasticizer (such as di-2-ethylhexyl phthalate or dibutyl phthalate), a rheology adjusting agent (such as fatty acid amide or fatty acid), a thixotropic agent, a thickening agent, or a dispersing agent. In addition, the second conductive layer may be masked or covered as previously mentioned for the first conductive layer, in order to minimize the exposed area.

The conductive layer with the paste may be heated at a temperature of 100-150° C., preferably 110-140° C., more preferably 115-135° C. to form the metal oxide coated substrate. In some embodiments, the paste may only dried, for instance, by placing in a desiccator, or by heating at a temperature less than 100° C.

The method involves a step of depositing a dye on the metal oxide particles on the conductive layer, thereby forming a flexible photoanode. Preferably the dye is applied as a liquid and may be sprayed or applied by some manner as mentioned previously for the Pt precursor solution. In another embodiment, the substrate may be submerged or immersed in a volume of the dye.

With the dye deposition, the metal oxide particles may be coated with a layer of the dye, and the dye molecules may be adsorbed or covalently bonded to the exterior surface of the metal oxide particles. In some embodiments, there may be parts of the conductive layer that are not contacted with a metal oxide particle, but are in contact with the dye. Alternatively, there may be parts of the conductive layer that are not in contact with either dye or a metal oxide particle.

In one embodiment, the dye may be a photosensitive ruthenium-polypyridine dye, for instance [Ru(4,4'-dicarboxy-2,2'-bipyridine)$_2$(NCS)$_2$] (also known as N3), or cis-diisothiocyanato-bis(2,2'-bipyridyl-4,4'-dicarboxylato) ruthenium(n) bis(tetrabutylammonium) (also known as N719 or RUTHENIZER 535-bisTBA). Other photosensitive ruthenium dyes that may be used include N749, Z907, N712, Ru(byp)$_3$Cl$_2$, and Ru(byp)$_3$Cl$_2$-imidazolidinone. In a preferred embodiment, the dye is N719. In alternative embodiments, the dye may be Rose Bengal (RB), Basic Blue 9, Rhodamine B, methylene blue, meso-tetraphenylporphine (TPP), 2-cyano-5-(4-dimethylaminophenyl)penta-2,4-dienoic acid (NKX-2553), or some other organic dye. In some embodiments, a mixture of two or more dyes may be used. In an alternative embodiment, a juice extract from a fruit or vegetable may be used as a dye, such as a juice extract from blueberries, blackberries, or red cabbage.

Preferably the dye is a photosensitizer, which refers to a compound that initiates a light-induced chemical reaction (e.g. photo-oxygenation), by absorbing electromagnetic radiation, which may be ultraviolet or visible light. Accordingly, the photosensitizer enters an excited state when exposed to light of a specific wavelength, and further reacts with either a substrate or ground state molecular oxygen, starting a cascade of energy transfer that results in an oxygenated compound.

The dye may be dissolved in a solvent such as methanol or ethanol at a concentration of 20 μM-10 mM, preferably 100 μM-1 mM, more preferably 200 μM-500 μM. In another embodiment, the dye may be dissolved in the solvent at a concentration of 0.01-2.00 mg/mL, preferably 0.10-1.00 mg/mL, more preferably 0.3-0.5 mg/mL. In another embodiment, a dye additive or staining additive may be added to the dye solution, such as chenodeoxycholic acid. In one embodiment, the dye may be left in contact with the metal oxide particles for a time period of 1-48 h, preferably 4-36 h, more preferably 16-30 h, or about 24 h, and at a temperature of 4-30° C., preferably 10-28° C., or about room temperature. In one embodiment, after the contacting, the substrate with the dye may be rinsed and/or dried. The drying may be done with a desiccator, an oven, or a heat gun or air dryer.

The fabrication method next involves a step of sandwiching an electrolyte between the flexible Pt counter electrode and the flexible photoanode, so that the electrolyte is in direct contact with the dye of the photoanode and the Pt nanoparticles of the Pt counter electrode. In one embodiment, the electrolyte may comprise an iodide such as an iodide/tri-iodide redox couple in a nitrile solvent. In one embodiment, the electrolyte may comprise an iodide/tri-iodide redox couple at a concentration of 5-500 mM, preferably 10-100 mM, more preferably 25-75 mM. In one embodiment, the nitrile solvent may be acetonitrile, methoxypropionitrile, or propionitrile. Preferably the nitrile solvent is acetonitrile. The electrolyte may be present in a liquid state or in a solid state. In one embodiment, the electrolyte has a viscosity of 10 to 8,000 cps (centipoises), preferably 100-8,000 cps, more preferably 1,000-8,000 cps.

The electrolyte may also comprise an additive such as an ionic liquid, a lithium salt, or a pyridine derivative (such as 4-tert-butyl-pyridine). In one embodiment, the electrolyte comprises 0.01-1.0 M lithium perchlorate ($LiClO_4$), preferably 0.05-0.5 M $LiClO_4$, more preferably about 0.1 M $LiClO_4$; 0.001-0.1 M lithium iodide (LiI), 0.005-0.05 M LiI, or about 0.01 M Li; and 0.1-100 mM iodine ($I_2$), preferably 0.5-10 mM $I_2$, or about 1 mM $I_2$, all in an acetonitrile (AN) solvent.

In one embodiment, the electrolyte may comprise a conductive polymer, such as polypyrrole, polyaniline, polythiophene, poly(3,4-ethylenedioxy-thiophene), poly(3-alkylthiophenes), polyacetylene, polyphenylene vinylene, and/or polyphenylene sulfide. In another embodiment, the electrolyte comprises or is made of a crosslinked polymer. A crosslinked polymer as used herein may refer to a type of polymers that are formed upon curing monomer resins (i.e. constituent units of a polymer) having a functionality of more than two (i.e. having more than two reactive sites) to form a three-dimensional polymer network structure that cannot be reprocessed into a different shape upon heating without chemical degradation. According to this embodiment, exemplary crosslinked polymers may include, but are not limited to epoxy (e.g. an imidazole-curable epoxy with an imidazole-based curing accelerator and a metal salt, or an amine-curable epoxy), polyester, vinylester, polyimide, polyamide-imide, polyurethane, polyphenol, poly(bis-maleimide), crosslinked rubbers, crosslinked polyvinyl alcohol, crosslinked polyethylene (e.g. crosslinked hydrogels), nylon, polyhexahydrotriazine, polyisocyanurate, polyglycolide, polylactic acid, polycaprolactone, polyhydroxyalkanoate, polyhydroxybutyrate, polyethylene adipate, polybutylene succinate, poly(3-hydroxybutyrate-co-3-hydroxyvalerate), polyethylene terephthalate, polybutylene terephthalate, polytrimethylene terephthalate, and polyethylene naphthalate. In one embodiment, the term "crosslinked polymer" may also refer to a thermoplastic polymer wherein polymers chains are physically bonded together (e.g. entanglement) without any covalent bonding therebetween. In a preferred embodiment, the crosslinked polymer has an average molecular weight between crosslinks in the range of 200-10,000 g/mol, preferably 2,000-5,000 g/mol, more preferably 3,000-5,000 g/mol, even more preferably 4,000-5,000 g/mol. The "average molecular weight between crosslinks" refers to an average molecular weight of a section of a polymer chain that lies between two crosslinking points. In another preferred embodiment, a glass transition temperature of the crosslinked polymer is in the range of −50 to 100° C., preferably −50 to 50° C., more preferably −50 to 0° C. In some preferred embodiments, the crosslinked polymer has a branch structure which makes it difficult to crystallize; the crosslinked polymer has a great interfacial adhesion with the semiconductor layer and is capable of infiltrate pore structures in the semiconductor layer; the crosslinked polymer has a great bonding strength between the anode and the cathode; the crosslinked polymer is capable of dissociating metal salts and transferring ions therethrough. An electrolyte solution having a dielectric constant within a range of 1-200, preferably 1-100, more preferably 1-50 may be absorbed within the crosslinked polymer.

In one embodiment, the method may further comprise a step of adding a barrier layer. The barrier layer may be added either before or after the dye, and may comprise compounds such as UV stabilizers, UV absorbing agents, and/or anti-oxidants. The barrier layer may improve the efficiency of the solar cell by converting UV irradiation into visible light, or may absorb UV irradiation to minimize dye degradation. In a related embodiment, one or more UV filters may be placed against the outside of the flexible DSSC, adjacent to the photoanode, the counter electrode, or both.

In one embodiment, the sandwiching an electrolyte between the flexible Pt counter electrode and the flexible photoanode involves a step of coupling or connecting the counter electrode and the photoanode with an adhesive agent. The adhesive agent may be a thermoset polymer (e.g. UV or heat-curable epoxies, UV or heat-curable acrylates, or cyanoacrylates). Preferably, the adhesive may be a cyanoacrylate such as methyl 2-cyanoacrylate (MCA), ethyl 2-cyanoacrylate (ECA, also known as KRAZY GLUE or SUPER GLUE), n-butyl cyanoacrylate (n-BCA), octyl cyanoacrylate, or 2-octyl cyanoacrylate. Accordingly, a layer of the adhesive agent is placed between the anode and the cathode and pressure, heat, and/or UV irradiation is applied thereto. In the embodiment wherein the electrolyte is in a liquid state, one or more fine holes (or cavities) may be formed somewhere on the adhesive agent so that the electrolyte may be injected into the gap between the photoanode and counter electrode through said holes (or cavities). Further, an external part of said holes (or cavities) may then be sealed with an adhesive agent. Alternatively, one or more holes may be made through the photoanode or the counter electrode for injecting an electrolyte within, and the hole may have a diameter of 0.5-2 mm, or about 1 mm. In the embodiment wherein the electrolyte is in the solid state, the electrolyte may be coated on the dye and metal oxide coated layer of the photoanode. The photoanode may be coated with the electrolyte using a roll knife coater, a Gravure coater, a die coater, a reverse coater, or some other application technique previously described. Then, the electrolyte may optionally be dried or cured, and finally, the cathode is disposed on the electrolyte via, for example, roll lamination. In another embodiment, the electrolyte may be first coated on the cathode, optionally dried or cured, and finally laminated on the anode. In one embodiment, the electrolyte infiltrates to the dye and metal oxide coated layer by applying heat. In another embodiment, rather than using an adhesive or thermosetting compound, the electrolyte may be sealed between the photoanode and the counter electrode with a gasket or a ring of film. The edges of the two flexible substrates may entirely align with each other, or may have one or more edges that are overhanging or not aligned. In one embodiment, the one or more edges of the flexible substrates may overhang or not align in order to provide a structure more suitable for handling, or to provide an area for connecting an electrical conduit. An electrical conduit may be attached to the counter electrode and photoanode by a clip or by soldering or using a conductive adhesive.

By sandwiching the electrolyte, the electrolyte forms a first electrical contact to the dye and the metal oxide particles of the photoanode, and the electrolyte forms a second electrical contact to the platinum nanoparticles of the flexible Pt counter electrode. As defined here, two materials forming an electrical contact means that there exists a path for electrons to flow between the two materials, which path has an electrical resistivity of at most $10^{-6}$ Ω·m, preferably at most $10^{-7}$ Ω·m, more preferably at most $10^{-8}$ Ω·m at a temperature of 20-25° C.

In one embodiment, the flexible DSSC has an open circuit voltage ($V_{OC}$) of 0.4-1.0 V, preferably 0.5-0.9 V, more preferably 0.6-0.9 V, even more preferably 0.68-0.75 V under solar irradiation or solar simulator irradiation (AM1.5 conditions), and at front and/or rear illumination. The $V_{OC}$ may be thought of as the voltage at a current density of 0 mA/cm$^2$ in an I-V (current-voltage) curve, such as that in FIGS. 7A-7C. In one embodiment, $V_{OC}$ from front illumination may be slightly larger than the $V_{OC}$ from rear illumination. A ratio of the front illumination $V_{OC}$ to the rear illumination $V_{OC}$ may range from 1:1-1.10:1, preferably 1.01:1-1.07:1, or about 1.03.1:1.

Figure 7A:
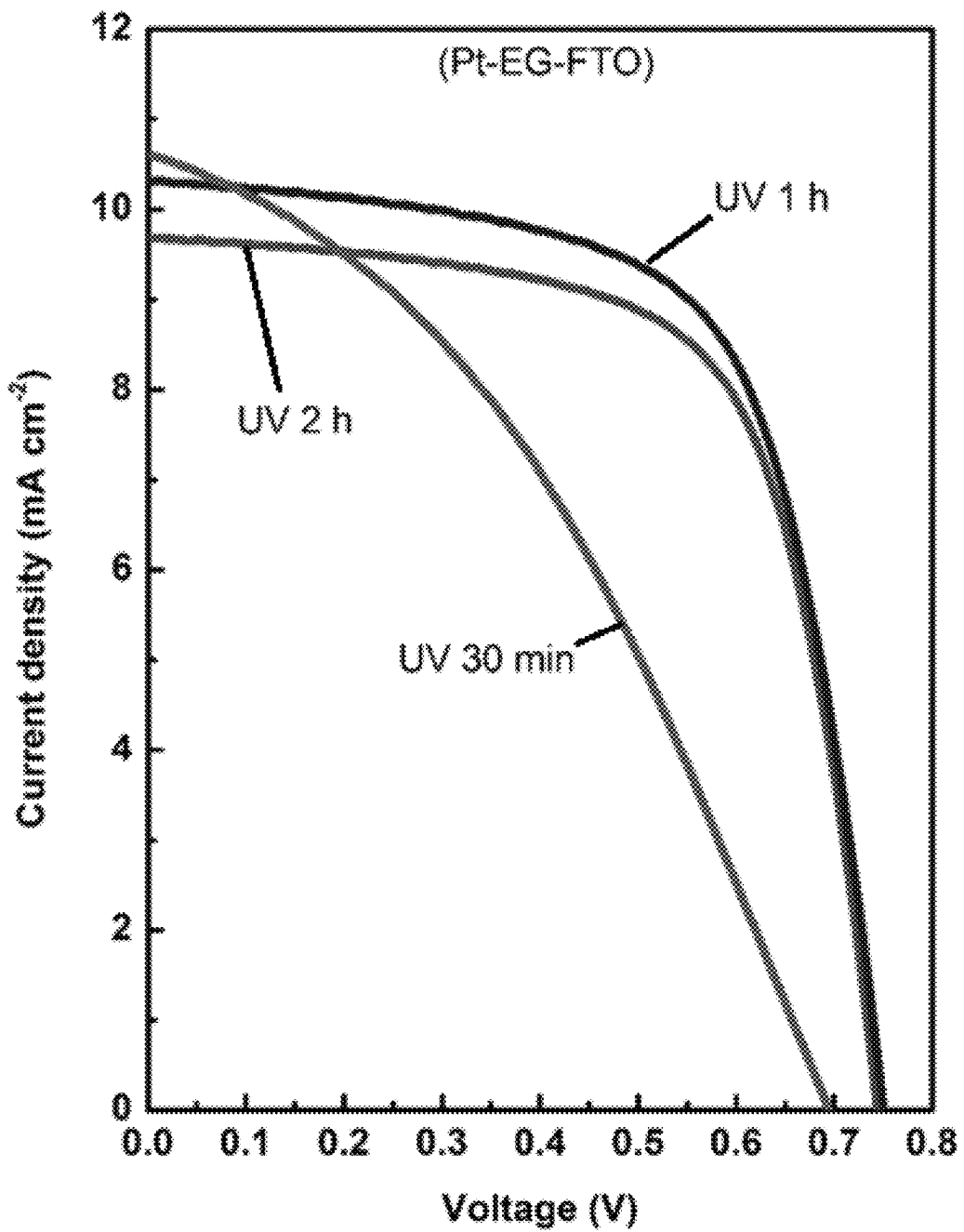
FIG. 7A shows a front illumination I-V curve of DSSCs based on photofabricated Pt CEs (Pt-EG-FTO).
Figure 7B:
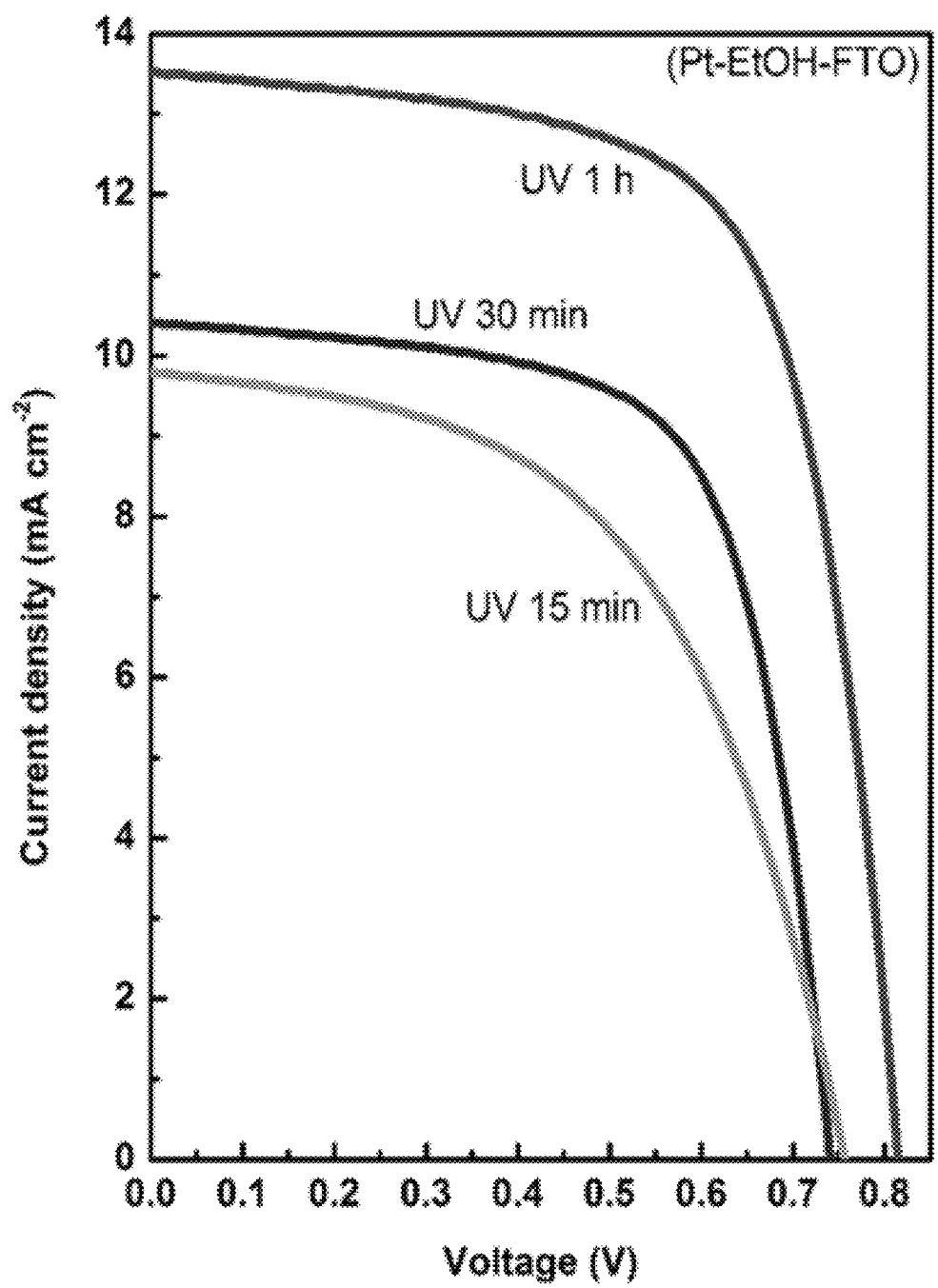
FIG. 7B shows a front illumination I-V curve of DSSCs with photofabricated Pt CEs (Pt-EtOH-FTO).
Figure 7C:
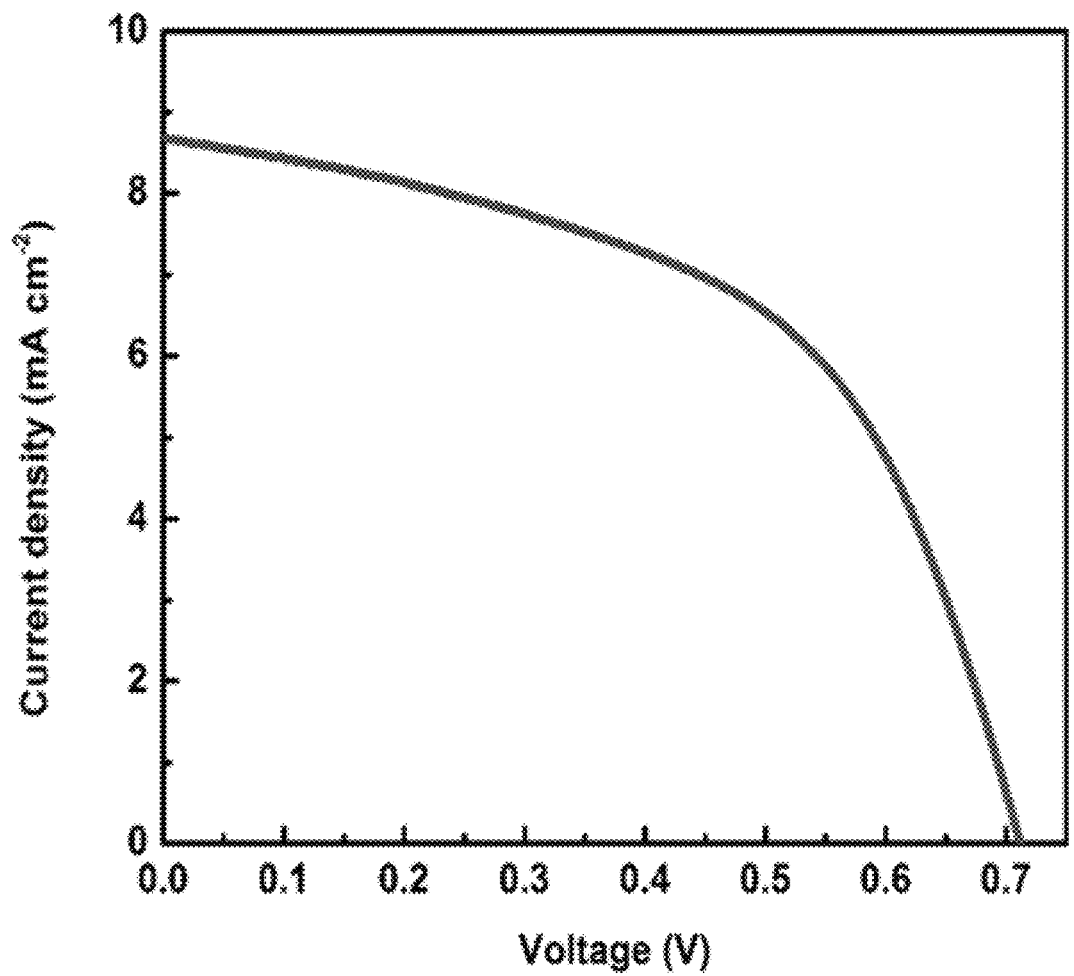
FIG. 7C shows a front illumination I-V curve of a flexible DSSC with a photofabricated Pt flexible CE (Pt-EtOH-ITO-PET).

A short circuit density may be thought of as the current density at 0 V in an I-V curve, again shown in FIGS. 7A-7C. In one embodiment, the flexible DSSC has a short circuit current density ($J_{SC}$) under front illumination of 5.0-17.0 mA/cm$^2$, preferably 6.0-12.0 mA/cm$^2$, more preferably 7.0-9.0 mA/cm$^2$, or about 8.6 mA/cm$^2$, or about 8.7 mA/cm$^2$. In one embodiment, the flexible DSSC has a short circuit current density ($J_{SC}$) under rear illumination of 5.0-10.0 mA/cm$^2$, preferably 6.0-9.0 mA/cm$^2$, more preferably 6.5-8.0 mA/cm$^2$, or about 7.1 mA/cm$^2$, or about 7.2 mA/cm$^2$. In one embodiment, a ratio of the rear illumination $J_{SC}$ to the front illumination $J_{SC}$ may be 0.50-1.00, preferably 0.60-0.90, more preferably 0.75-0.87, or about 0.82.

Another defining term in the overall behavior of a solar cell is the fill factor (FF). This factor is a measure of quality of a solar cell. This is the available power at the maximum power point divided by the open circuit voltage ($V_{OC}$) and the short circuit current density ($J_{SC}$). In one embodiment, the flexible DSSC has a fill factor (FF) of 45-90%, preferably 50-70%, more preferably 51-58%, or about 53% under solar irradiation or solar simulator irradiation (AM1.5 conditions), and at front and/or rear illumination.

Illumination efficiency is the percentage fraction of incident radiation power that is converted to electrical power by the solar cell. In one embodiment, the flexible DSSC has a front illumination efficiency (η) of 2.0-10.0%, preferably 2.5-7.5%, more preferably 3.0-5.0%, even more preferably 3.1-3.5%, or about 3.2%, or about 3.3%, under solar irradiation or solar simulator irradiation (AM1.5 conditions).

In one embodiment, the flexible DSSC has a rear illumination efficiency (η) of 1.0-9.0%, preferably 1.5-6.0%, more preferably 2.0-4.0%, even more preferably 2.2-3.0%, or about 2.6% under solar irradiation or solar simulator irradiation (AM1.5 conditions).

In one embodiment, the flexible DSSC has a percentage ratio ($η_R$) of rear illumination efficiency to front illumination efficiency of 60-95%, preferably 65-85%, more preferably 70-82%, or about 80% under solar irradiation or solar simulator irradiation (AM1.5 conditions).

In one embodiment, where a solar simulator is used to produce irradiation, the radiation source may be a xenon arc lamp or a halogen lamp. In one embodiment, the radiation source may be fitted with a dichroic reflector and/or an optical filter in order to better reproduce solar light illumination, such as illumination having an AM1.5G spectrum, which may be known as the "global standard" spectrum.

The air mass coefficient (AM) defines the direct optical path length through the Earth's atmosphere, expressed as a ratio relative to the path length vertically upwards, i.e. at the zenith. The air mass coefficient can be used to help characterize the solar spectrum after solar radiation has traveled through the atmosphere. The air mass coefficient is commonly used to characterize the performance of solar cells under standardized conditions, and is often referred to using the syntax "AM" followed by a number. The air mass number is dependent on the Sun's elevation path through the sky and therefore varies with time of day and with the passing seasons of the year, and with the latitude of the observer. For characterizing terrestrial power-generating panels, the "AM1.5" standard is commonly used for illumination. "AM1.5" represents sunlight through a 1.5 atmosphere thickness, which corresponds to a solar zenith angle of 48.2°. The spectrum may be similar to those defined by ASTM G-173 and IEC 60904 standards. In other embodiments, the illumination may have an AM1.5D spectrum, which is known as the "direct standard" spectrum. In alternative embodiments, a different illumination standard may be used, such as AM0, AM1, AM2, AM3, or AM38.

In one embodiment, the solar simulator output to the flexible DSSC to measure the above parameters ($V_{OC}$, $J_{SC}$, FF, illumination efficiency, may be 90-110 mW/cm$^2$, preferably 95-105 mW/cm$^2$, more preferably 98-102 mW/cm$^2$, or about 100 mW/cm$^2$.

Preferably, where the flexible DSSC is tested to measure the above parameters while under illumination, the temperature of the flexible DSSC is kept from overheating, for instance, by a heat sink, a cooling block, an air fan, or air conditioning. Preferably a temperature of the flexible DSSC is less than 50° C., preferably less than 45° C., more preferably less than 40° C.

In one embodiment, the method may only consist of the steps necessary for making a flexible, Pt counter electrode. This procedure involves the steps of depositing a solution comprising a platinum precursor and an alcohol onto a conductive layer of a flexible substrate to produce a coated substrate and irradiating coated substrate with a UV lamp to form crystalline platinum nanoparticles on the first substrate. The different parameters and embodiments of these steps and materials have been described previously.

The examples below are intended to further illustrate protocols for preparing and characterizing the flexible bifacial dye-sensitized solar cell, and uses thereof, and are not intended to limit the scope of the claims.

Example 1

Results

Platinum counter electrodes were photofabricated under different fabrication parameters and characterized. Platinic acid precursor at a concentration of 0.02 M in ethylene glycol (EG) was spin coated at 2000 rpm for 30 s at a ramp rate of 500 rpm. 20 µL of the EG solution of $H_2PtCl_6$ were deposited on an area of 0.25 cm$^2$ before spinning. Three successive spin coating cycles were conducted to ensure proper adhesion of the Pt precursor solution on the FTO substrates at the chosen spin coating speed. After the spin coating cycles had been completed, SCOTCH tape used for the exposure of the coated area was removed before treatment with UV irradiation at ambient room conditions. On completion of the UV irradiation, the Pt precursor was reduced to Pt on the FTO substrate (FIG. 1A). The conversion was confirmed by different characterizations reported in this work. To get proper insight into the UV conversion process and attaining advantageous parameters for the photofabrication process, effect of irradiation time was studied. The loading amount of the Pt precursor was also investigated by three different spin coating cycles. Finally, we examined the versatility of the photofabrication techniques by using solvent other than EG (in this case ethanol), a drop coating method, and a flexible substrate (PET-ITO).

Effect of Irradiation Time

Figure 1B:
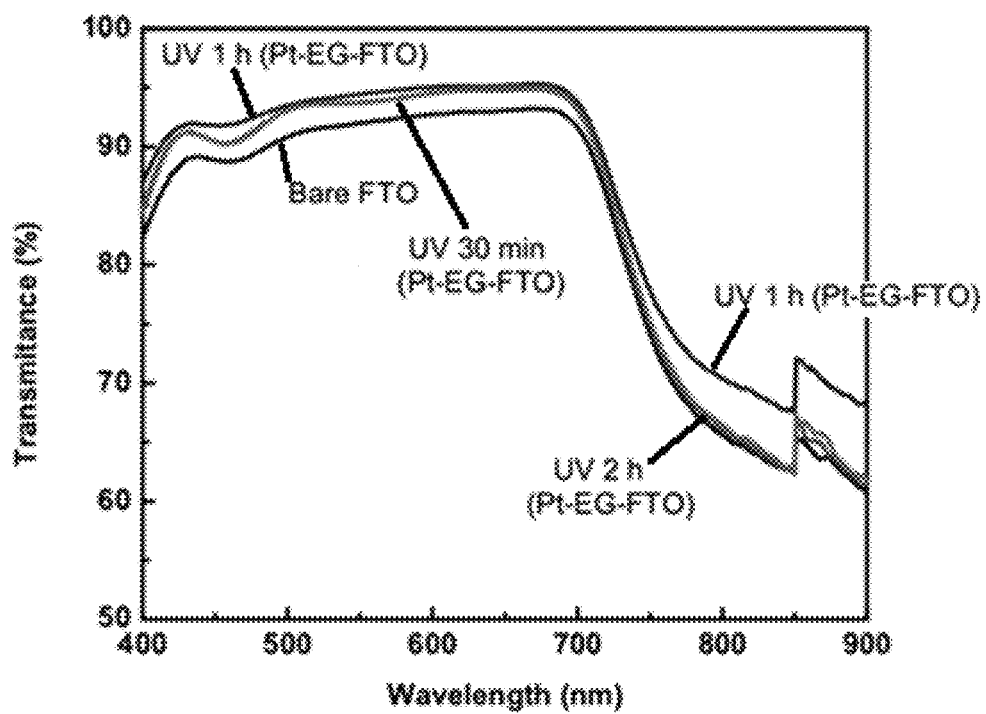
FIG. 1B shows transmittance spectra of photofabricated Pt CEs (Pt-EG-FTO) with different UV irradiation times and bare FTO for comparison.
Figure 1C:
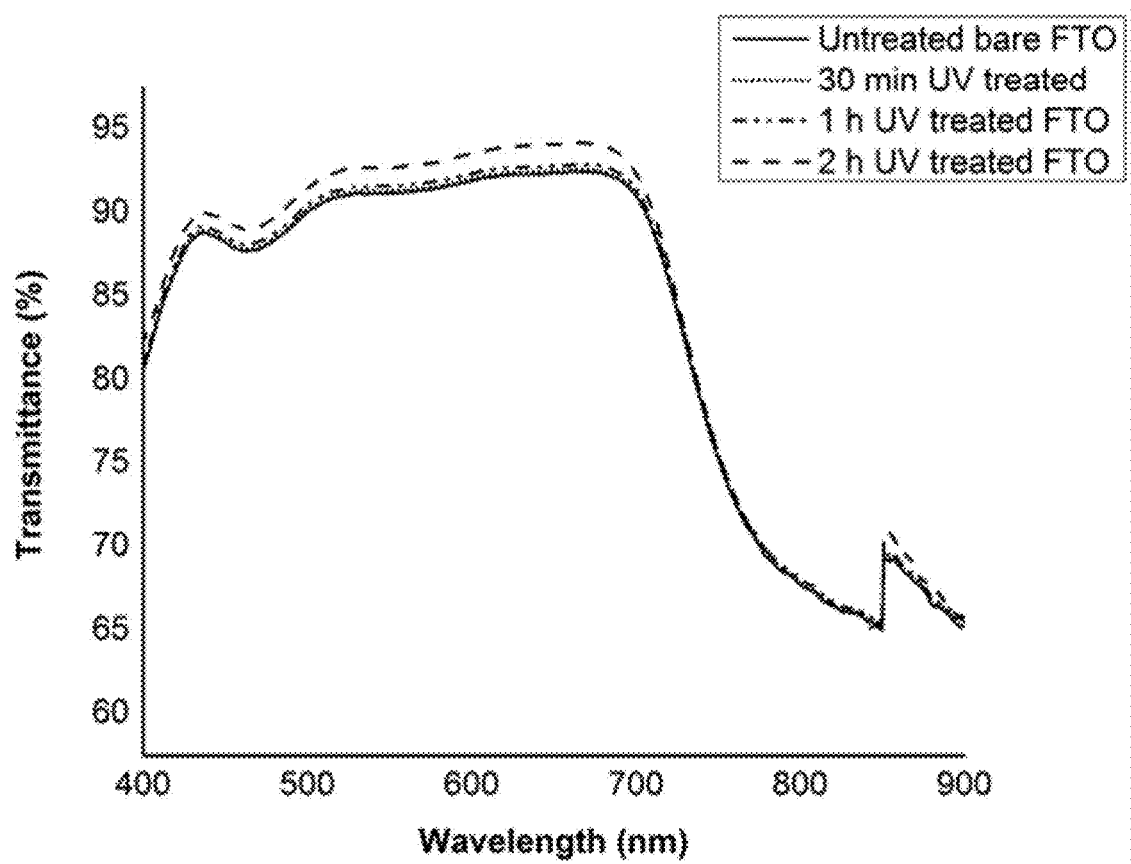
FIG. 1C shows transmittance spectra of a UV irradiated bare FTO glass at different irradiation times.
Figure 1D:
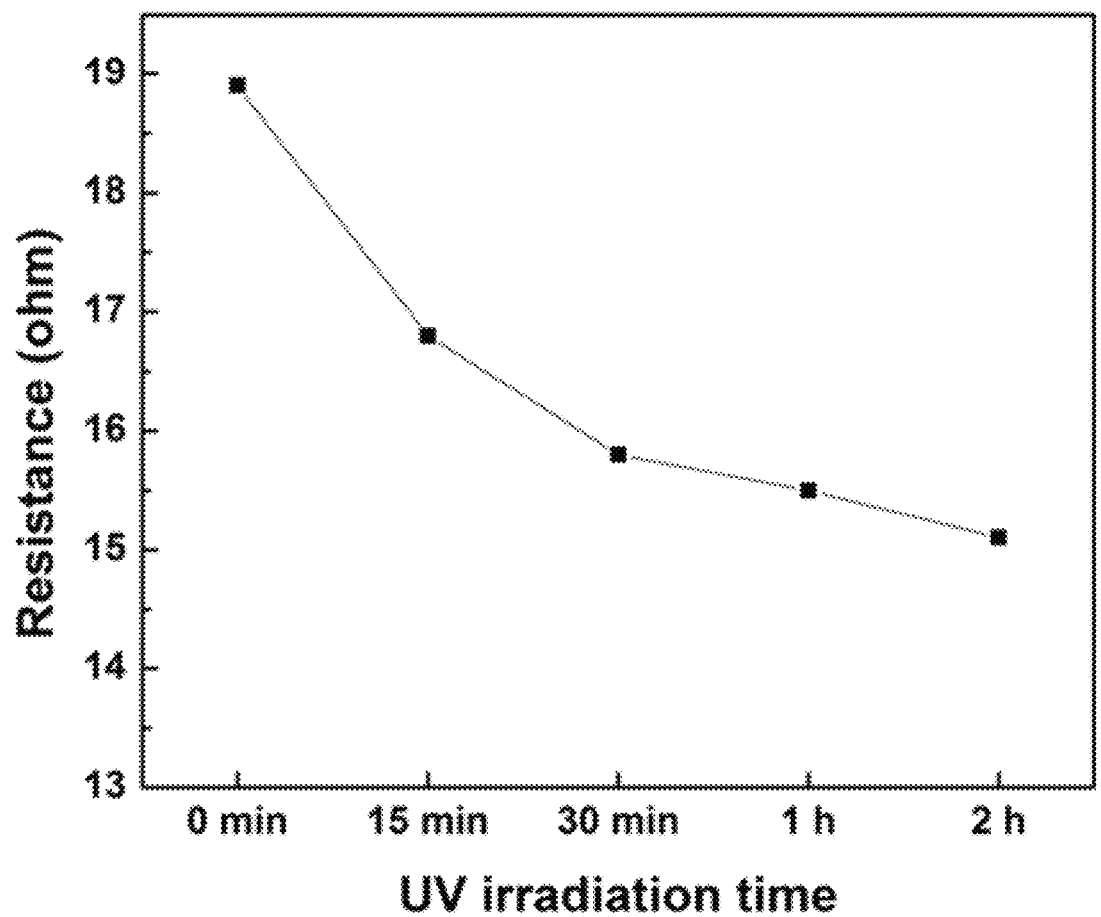
FIG. 1D shows the UV irradiation time versus resistance of a bare FTO.

To study the effects of irradiation time, samples were treated with different UV irradiation times of 2 h, 1 h, and 30 min. The prepared samples with different irradiation times were characterized and used as CEs in the fabrication of DSSCs. FIG. 1B shows the transmittance spectra of the three samples and that of bare FTO glass. The visible light transmittance of the three samples are higher than that of bare FTO glass. For an understanding of the recorded enhancement of transmittance in the three samples, we examined the effect of UV irradiation on bare FTO glass. FIG. 1C shows the transmittance spectra of a pre-cleaned FTO glass that was treated with UV irradiation for different time intervals. The transmittance spectra were measured successively at 30 min, 1 h, and 2 h UV irradiation times. We noticed dependence of transmittance spectra on irradiation time. With this observation, the effect of UV irradiation on the resistivity the FTO sample was investigated by measuring the resistance between two pre-marked points at 15 min, 30 min, 1 h, and 2 h UV irradiation time. The resistance of the UV treated FTO was found to decrease as the irradiation time increases, as shown in FIG. 1D. Meanwhile, the transmittance spectra of FIG. 1A suggest that the UV interaction with the Pt precursor on the FTO glass and subsequent formation of Pt metal equally played part in the enhancement of the transparency of the Pt EG-FTO CEs within the visible light region. The sample that underwent 1 h UV irradiation photofabrication showed the highest transmittance across the visible light region of 400 nm to 720 nm. The samples that were treated for 30 min and 2 h had almost the same transmittance spectra across the same wavelengths.

Figure 1E:
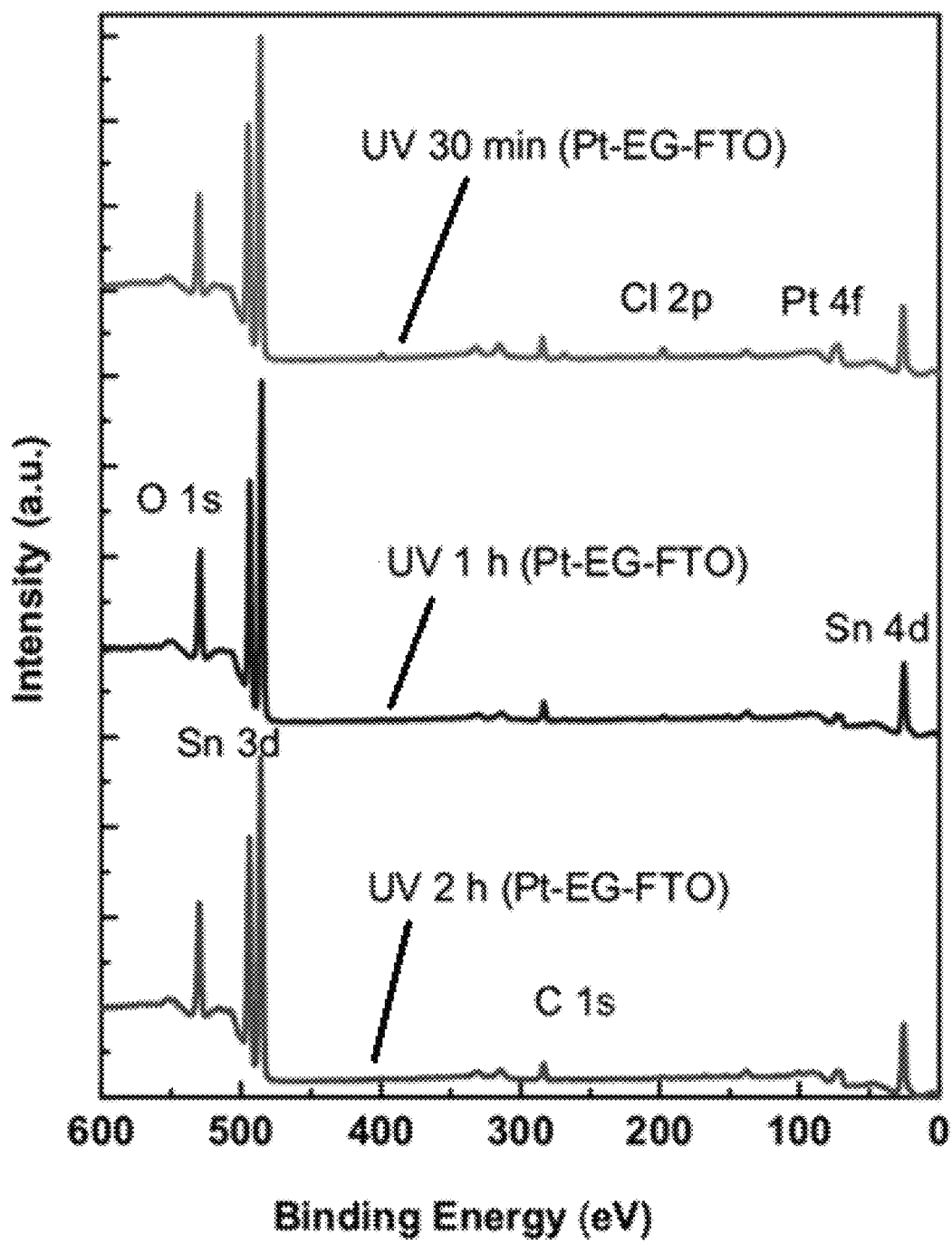
FIG. 1E shows XPS survey spectra of a Pt-EG-FTO sample at different irradiation times.
Figure 1F:
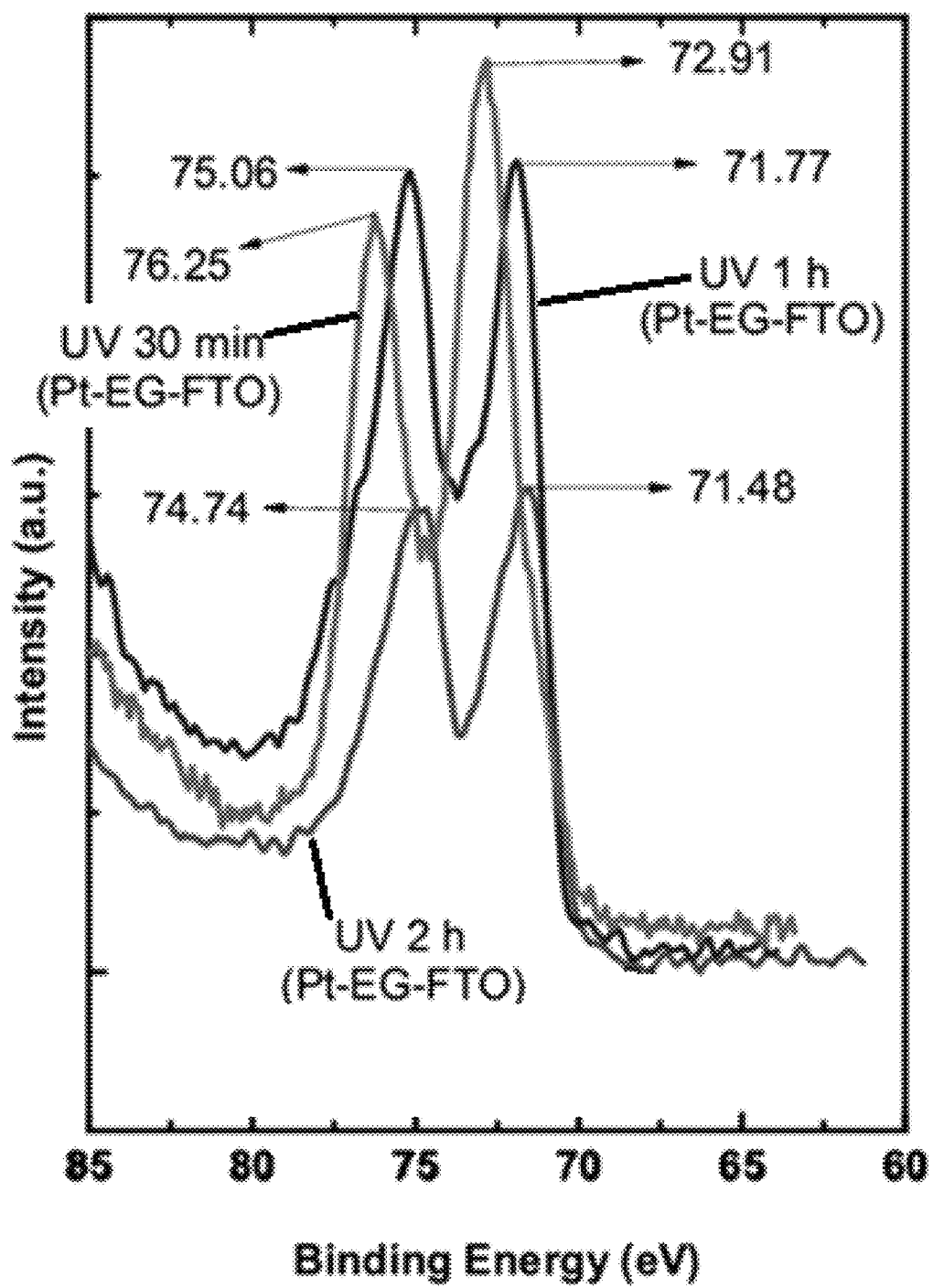
FIG. 1F shows XPS spectra comparing Pt 4f peaks of a photofabricated Pt CE (Pt-EG-FTO) at different irradiation times.

The photoreduction of the $H_2PtCl_6 \cdot 6H_2O$ in ethylene glycol (EG) to Pt metal for the photofabricated CEs was investigated by XPS. The XPS spectra of the three samples with different UV irradiation times were compared to understand the effect of UV irradiation time on the photoreduction process. FIG. 1E shows the XPS survey spectra of the three different samples with 3 cycles of spin coating and UV irradiation of 30 min, 1 h, and 2 h. All three samples exhibit a platinum peak at Pt 4f orbital. A small chlorine peak at Cl 2p is observed to reduce in size as UV irradiation time is increased. For instance, at 1 h UV irradiation time, the Cl 2p peak is much smaller than at a UV irradiation time of 30 min, and is absent at 2 h UV irradiation time. FIG. 1F compares the platinum peaks of the three samples at the respective UV irradiation times. These peaks might be due to degradation of the platinum coating on the FTO. The Pt peak at 30 min UV irradiation exhibits a binding energy of the Pt $4f_{7/2}$ at 72.91 eV, which is shifted away from the peaks at 71.77 eV and 71.48 eV for the 1 h and 2 h UV irradiation times, respectively. The Pt $4f_{7/2}$ binding energies of the of the 1 h and 2 h UV irradiation times are closest to the atomic platinum binding energy of 71.2 eV. The Pt peak at 2 h UV irradiation has a lower intensity peak than those of 30 min and 1 h irradiation. Hence, the correct UV irradiation time for the photofabrication process is important.

Figure 2C:
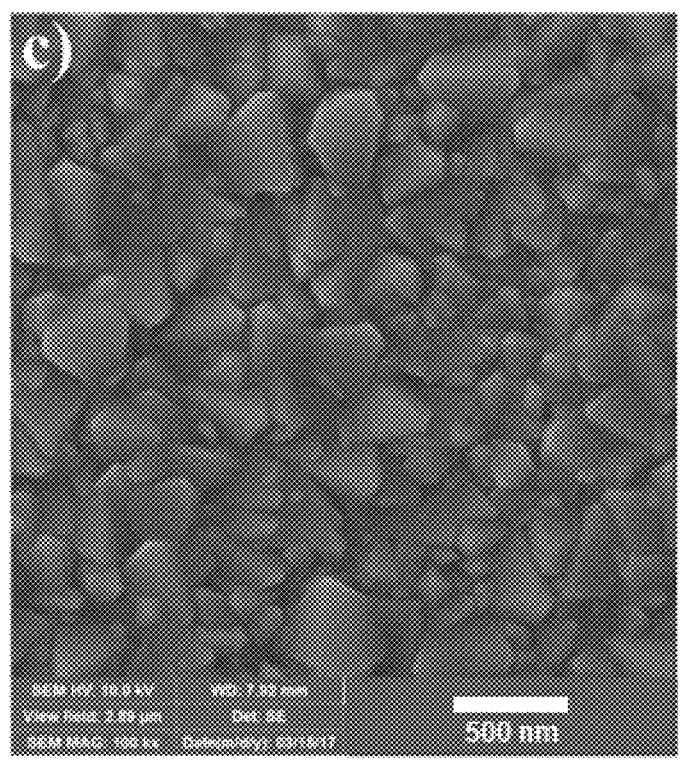
FIG. 2C is a SEM image of a photofabricated Pt CE with 30 min UV irradiation time.

The SEM images shown in FIGS. 2A, 2B, and 2C for the three photofabricated Pt CEs with different UV irradiation times of 2 h, 1 h, and 30 min, respectively, indicate that Pt nanoparticles are well dispersed on the FTOs with no agglomeration visible on the morphology of the photofabricated Pt CEs.

Figure 2D:
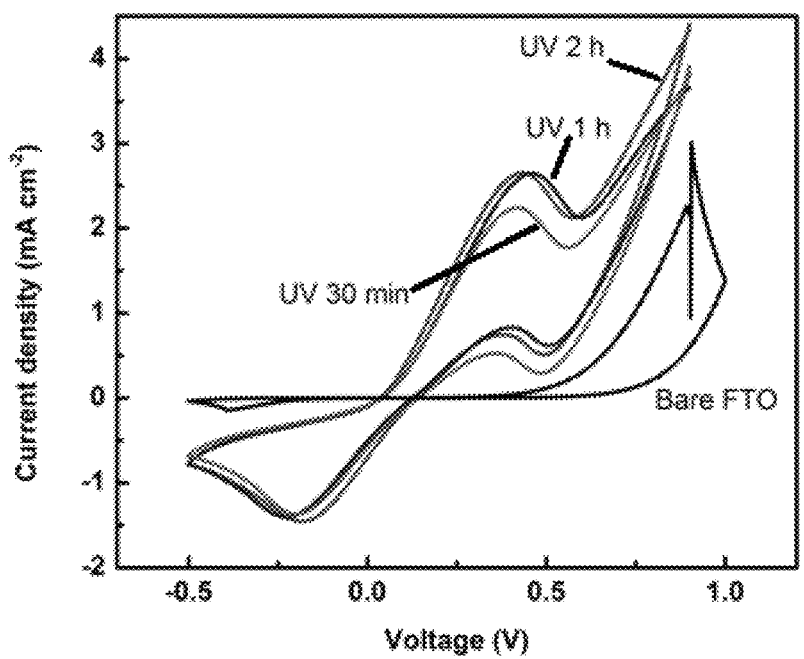
FIG. 2D shows a cyclic voltammetry (CV) scan of photofabricated Pt CEs (Pt-EG-FTO) at irradiation times of 2 h, 1 h, and 30 min.

The electrochemical characterization of the samples was carried out to study the catalytic activity of the samples in triiodide/iodide electrolyte. FIG. 2D shows cyclic voltammograms (CV) of the samples. The bare FTO sample shows no catalytic activity as no reduction or oxidation is present in the CV scan of the sample. UV irradiated Samples with 1 h and 2 h UV irradiation show both reduction and oxidation peaks that are aligned throughout the CV scan while the sample with 30 min UV irradiation exhibits a slight shift in the reduction and oxidation peaks. CV measurement is particularly useful in understanding the regeneration of dye molecules from the triiodide/iodide electrolyte after the photoreduction of the dye molecule in generation of electron into the $TiO_2$ photoanode material, as redox equilibrium is desired for the continuous functioning of the solar cells. The redox reaction at the electrolyte/photofabricated Pt CE interface is as given in equation (1):

$$I_3^- + 2e^- \rightarrow 3I^-$$

$$3I^- \rightarrow I_3^- + 2e^- \quad (1)$$

Figure 2E:
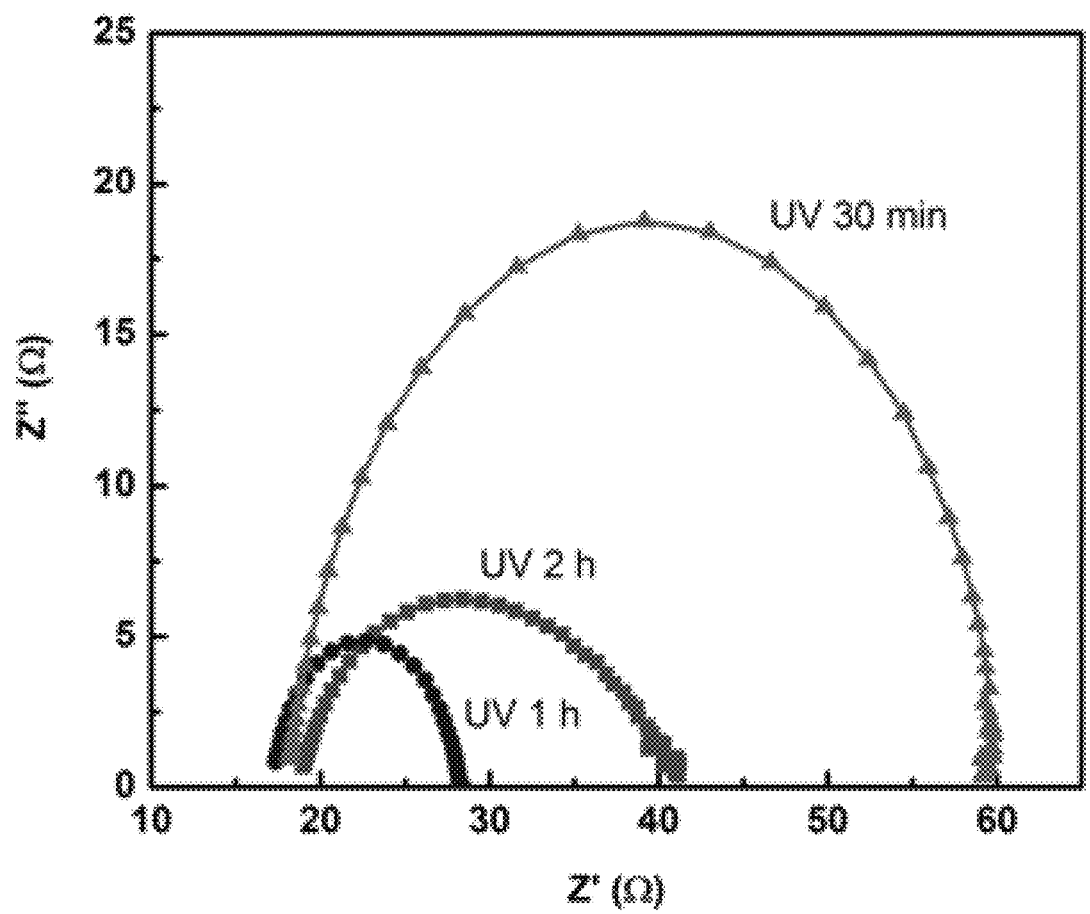
FIG. 2E shows Nyquist plots of photofabricated Pt CEs (Pt-EG-FTO) at different irradiation times of 2 h, 1 h, and 30 min.
Figure 2F:
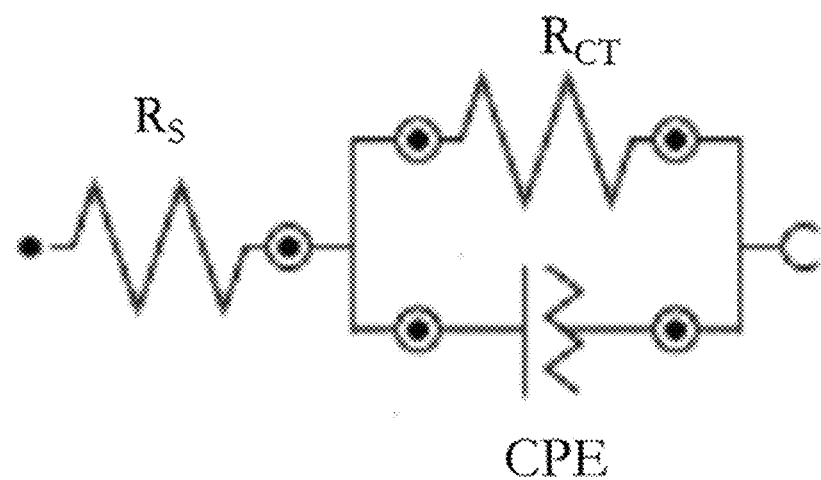
FIG. 2F is the circuit model used for fitting the EIS Nyquist plots of the samples.
Figure 2G:
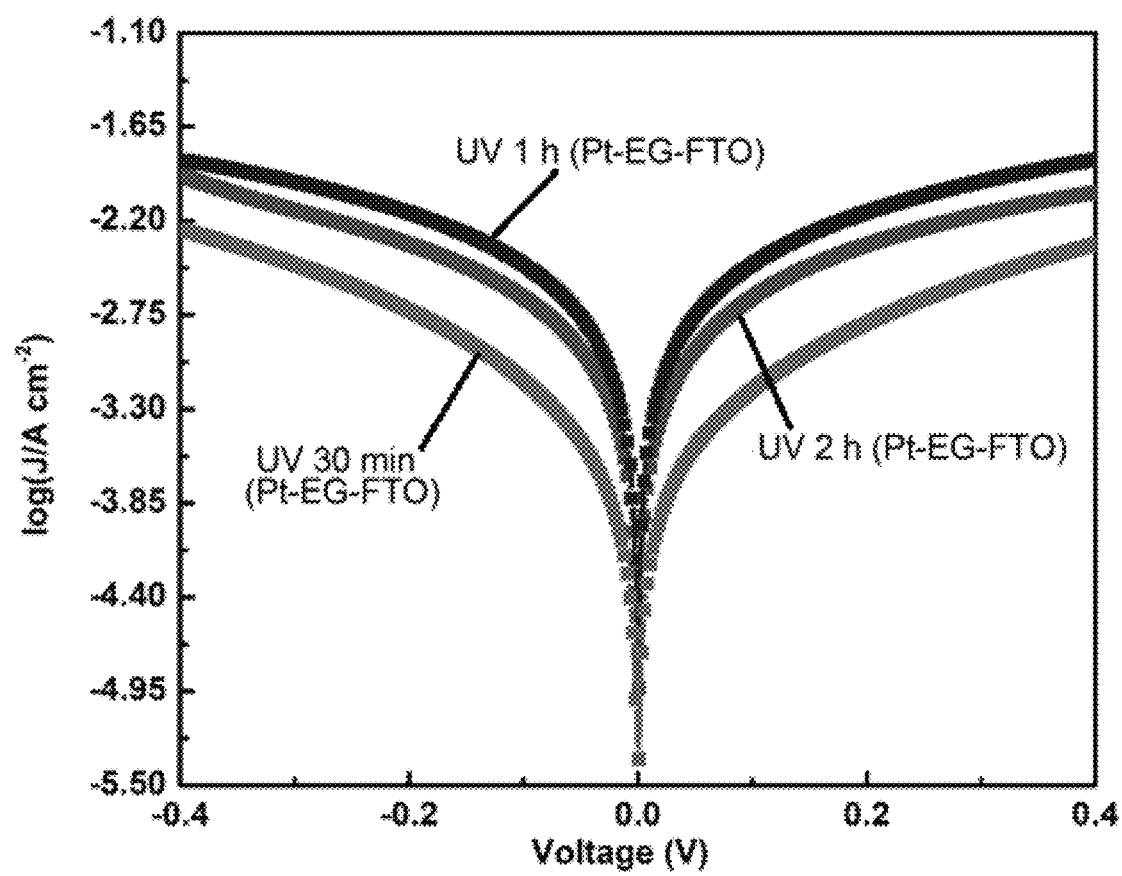
FIG. 2G shows Tafel plots of Pt-EG-FTO CEs with UV irradiation time of 2 h, 1 h and 30 min.

The Nyquist impedance plot shown in FIG. 2E illustrates the charge transfer mechanism between the electrolyte and photofabricated Pt CEs in symmetric dummy cells. The fitting of the Nyquist plots is carried out within the NOVA 2.1 software. The equivalent circuit used in fitting the Nyquist plot is as shown in FIG. 2F. The series resistance $R_S$, charge transfer resistance $R_{CT}$, constant phase element (CPE) and the exchange current density ($J_0$) of the dummy cells are summarized in Table 1. The sample with 1 h UV irradiation exhibits the least series resistance and charge transfer resistance of 17.641Ω and 10.639Ω, respectively. The 2 h UV irradiated sample also performed better than the 30 min UV irradiated sample. The surface area of the photofabricated Pt CEs as given by the CPE shows dependency with UV irradiation times (Table 1). The values of $J_0$ are obtained from equation (2):

$$J_0 = (R \cdot T)/(n \cdot F \cdot R_{CT}) \quad (2)$$

where R represents the molar gas constant, T (=298 K) is the absolute temperature, n represents the number of electrons involved in the triiodide reduction at the electrode/electrolyte interface having a value of 2, and F is the Faraday constant. See Lan, Z., Wu et al., incorporated herein by reference in its entirety. The Tafel plots for these Pt CEs are as shown in FIG. 2G. Pt-EG-FTO UV irradiated for 1 h exhibited the highest value for both the anodic and cathodic current densities.

From the transmittance, XPS, and electrochemical characterizations results discussed above, we concluded that 30 min irradiation was not sufficient to reduce the Pt precursor to Pt metal. On the other hand, excessive UV exposure appears to be detrimental to the photofabrication process as is the case for the 2 h UV irradiated sample. Hence, 1 h irradiation time was used for the UV photofabrication Pt CE technique.

TABLE 1

Nyquist impedance parameters of photofabricated Pt CEs

| Photofabricated Pt-CEs | $R_S$ (Ω) | $R_{CT}$ (Ω) | CPE (μF) | $J_0$ (mA · cm$^{-2}$) |
|---|---|---|---|---|
| UV 2 h (Pt-EG-FTO) | 18.21 | 22.697 | 11.91 | 0.57 |
| UV 1 h (Pt-EG-FTO) | 17.64 | 10.639 | 7.09 | 1.20 |
| UV 30 min (Pt-EG-FTO) | 18.17 | 40.788 | 5.69 | 0.32 |
| UV 1 h (Pt-EtOH-FTO) | 30.36 | 24.098 | 10.38 | 0.53 |
| UV 30 min (Pt-EtOH-FTO) | 37.65 | 143.53 | 9.20 | 0.09 |
| UV 15 min (Pt-EtOH-FTO) | 22.17 | 241.04 | 5.58 | 0.05 |
| UV 1 h (Pt-EtOH-PET-ITO) | 366.10 | 1655.30 | 0.39 | 0.008 |

Effect of Solvents

Figure 3A:
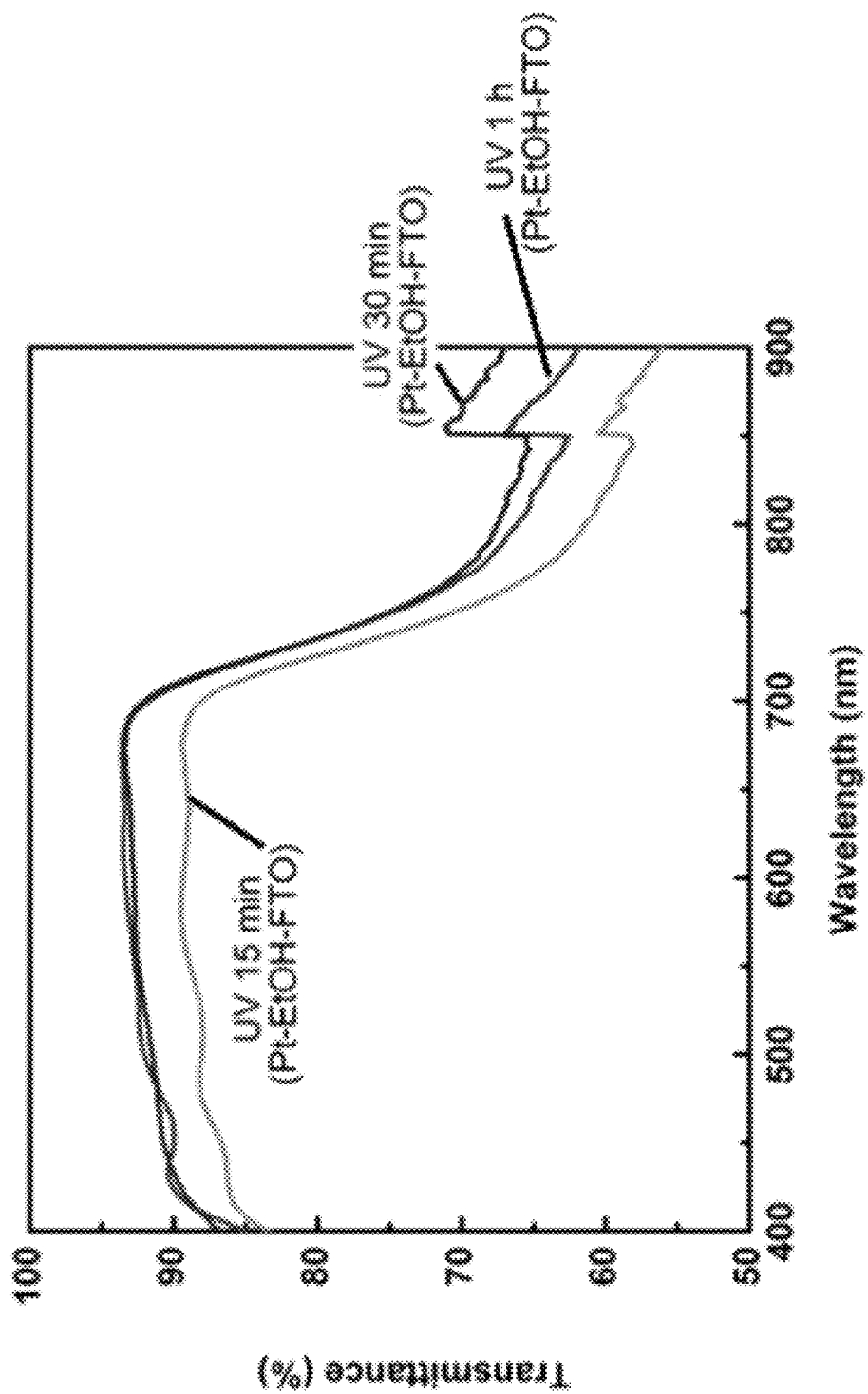
FIG. 3A shows transmittance spectra of Pt CEs (Pt-EtOH-FTO) with different irradiation times.

The versatility of our photofabrication technique with respect to different solvents is reported. Here, we chose ethanol as a representative solvent of other suitable solvents that are used in the synthesis of Pt metal from $H_2PtCl_6 \cdot 6H_2O$ precursor. Ethanol, being a nontoxic solvent, has an advantage of a low boiling point of 78° C. compared to ethylene glycol (EG), and it can therefore evaporate more easily. Owing to this advantage, a drop casting method was used for depositing the platinic acid in ethanol precursor for the photofabrication process. The drop casting method utilized much lower platinic acid solution, leading to minimal Pt loading as compared to spin coating process that results in wastage of material. For the drop casting process, 30 µL of 0.02 M solution of $H_2PtCl_6 \cdot 6H_2O$ in ethanol was dropped onto an FTO glass having an exposed area of 0.25 cm². Three samples were prepared using this approach and then UV irradiated for 1 h, 30 min, or 15 min. FIG. 3A shows the transmittance spectra of the photofabricated Pt CEs from the ethanolic platinic acid solution. Across the entire visible light wavelength region, each of the three samples has a greater transmittance the bare FTO.

Figure 3B:
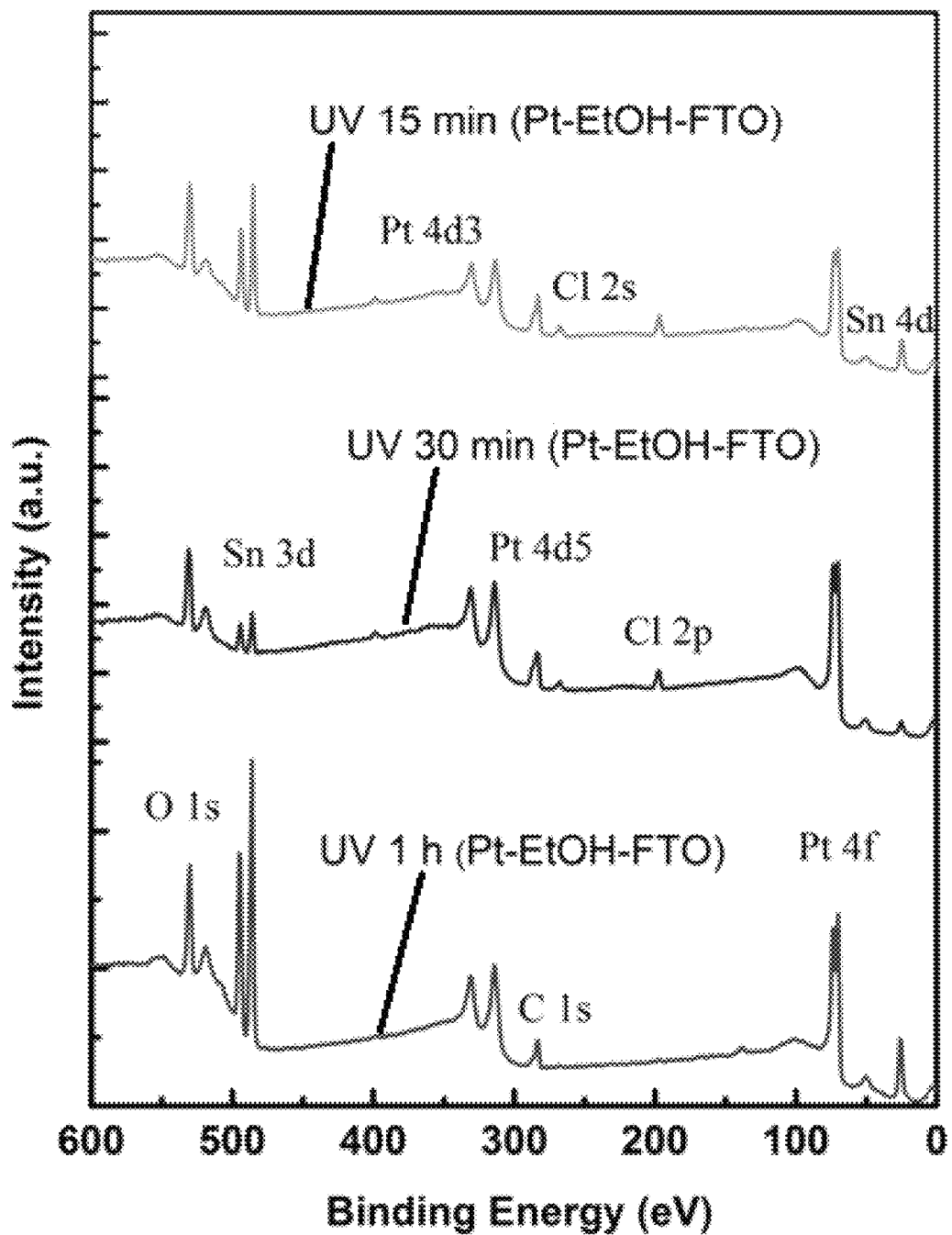
FIG. 3B shows XPS survey spectra of photofabricated Pt CEs (Pt-EtOH-FTO) with different UV irradiation time.
Figure 3C:
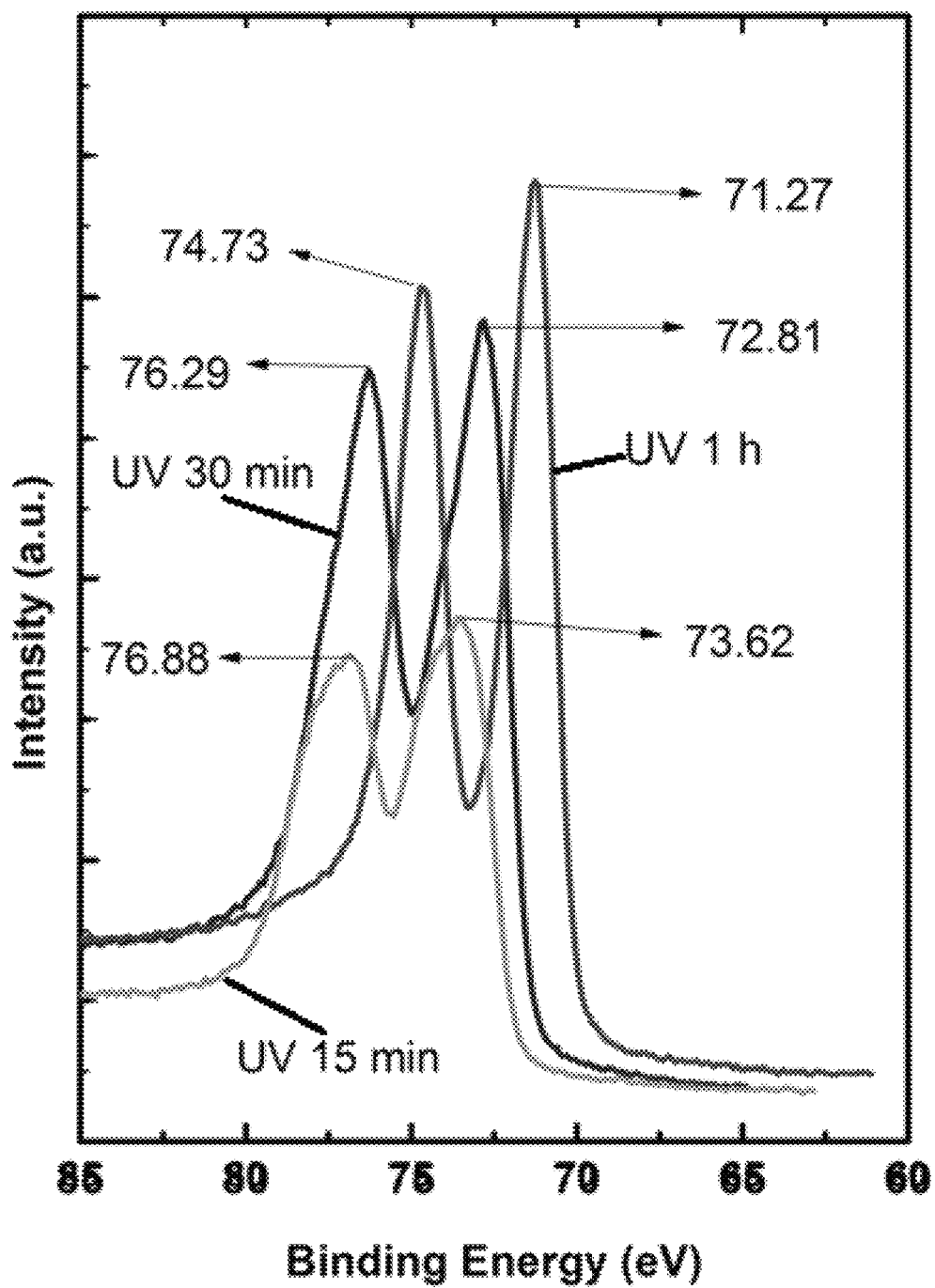
FIG. 3C shows XPS spectra comparing Pt 4f peaks of a photofabricated Pt CE (Pt-EtOH-FTO) at different irradiation times.

FIG. 3B shows the XPS spectra of the photofabricated Pt CEs from ethanol based platinic acid solution. All three samples at different UV irradiation times show platinum peaks that are more prominent than those of the samples photofabricated from EG platinic acid solution. This indicates that the drop coated precursor samples have a better and more efficient platinum loading than the spin coated samples. The effect of UV irradiation time can as well be seen from the XPS spectra. As UV irradiation time increases from 15 min to 1 h, the platinum peaks can be seen to increase with respect to the irradiation time (FIG. 3C). Meanwhile, the chlorine peaks decrease as the UV irradiation time increases (FIG. 3B), confirming the photoreduction of the $H_2PtCl_6 \cdot 6H_2O$ in ethanol to Pt. Pt-EtOH-FTO with 1 h of UV irradiation exhibited Pt $4f_{7/2}$ peak at a binding energy of 71.27 eV, while Pt-EtOH-FTO with 30 min and 15 min UV irradiation had a shifted Pt $4f_{7/2}$ peaks at binding energies of 72.81 and 73.62 eV, respectively.

The SEM images of photofabricated Pt CEs at different irradiation times are presented in FIGS. 4A-4C. FIGS. 4A, 4B, and 4C show samples exposed to 1 h, 30 min, and 15 min UV irradiation, respectively. FIG. 4A shows similarly well dispersed Pt particles on the FTO. However, FIG. 4C shows a different morphology of sheet and cloud-like structures indicating that the ethanolic platinic acid solution has only been partially photoreduced, while FIG. 4B shows traces of the sheet and cloud-like structures that are seen in FIG. 4C, further underscoring that 30 min UV irradiation was not sufficient for the photofabrication process.

Figure 4D:
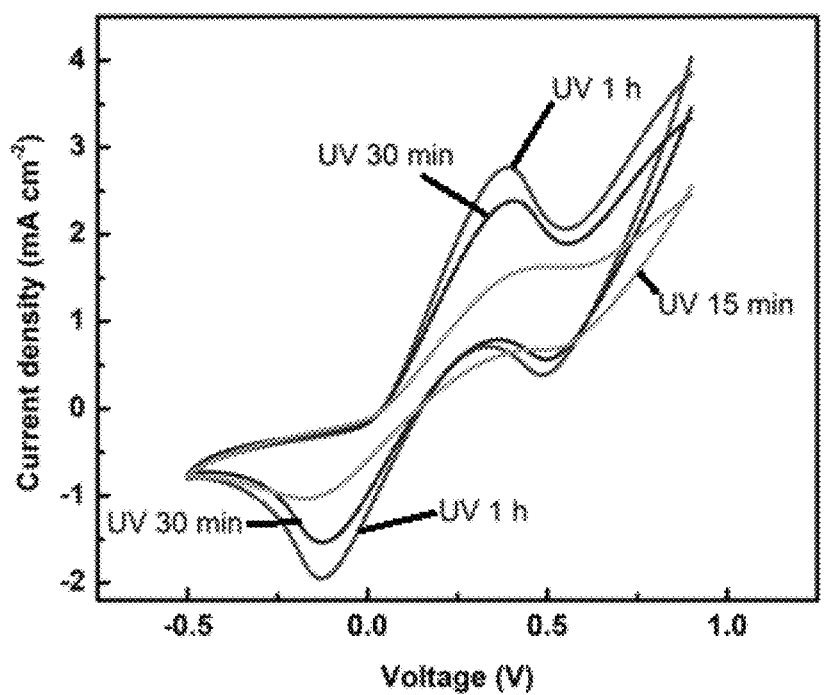
FIG. 4D shows a cyclic voltammetry (CV) scan of photofabricated Pt CEs (Pt-EtOH-FTO) at irradiation times of 1 h, 30 min, and 15 min.

The CV scan measurements of the photoreduced ethanolic platinic acid based Pt CEs are presented in FIG. 4D. Consistent with the XPS spectra and SEM images, the 15 min UV irradiated sample showed poor catalytic activity as it exhibits little reduction and oxidation peaks in the CV scan measurement. On the other hand, the 1 h UV irradiated sample showed more prominent reduction and oxidation peaks, indicating very good catalytic activity. Pt CE photofabricated with 30 min UV irradiation equally manifested good catalytic activity.

Figure 4E:
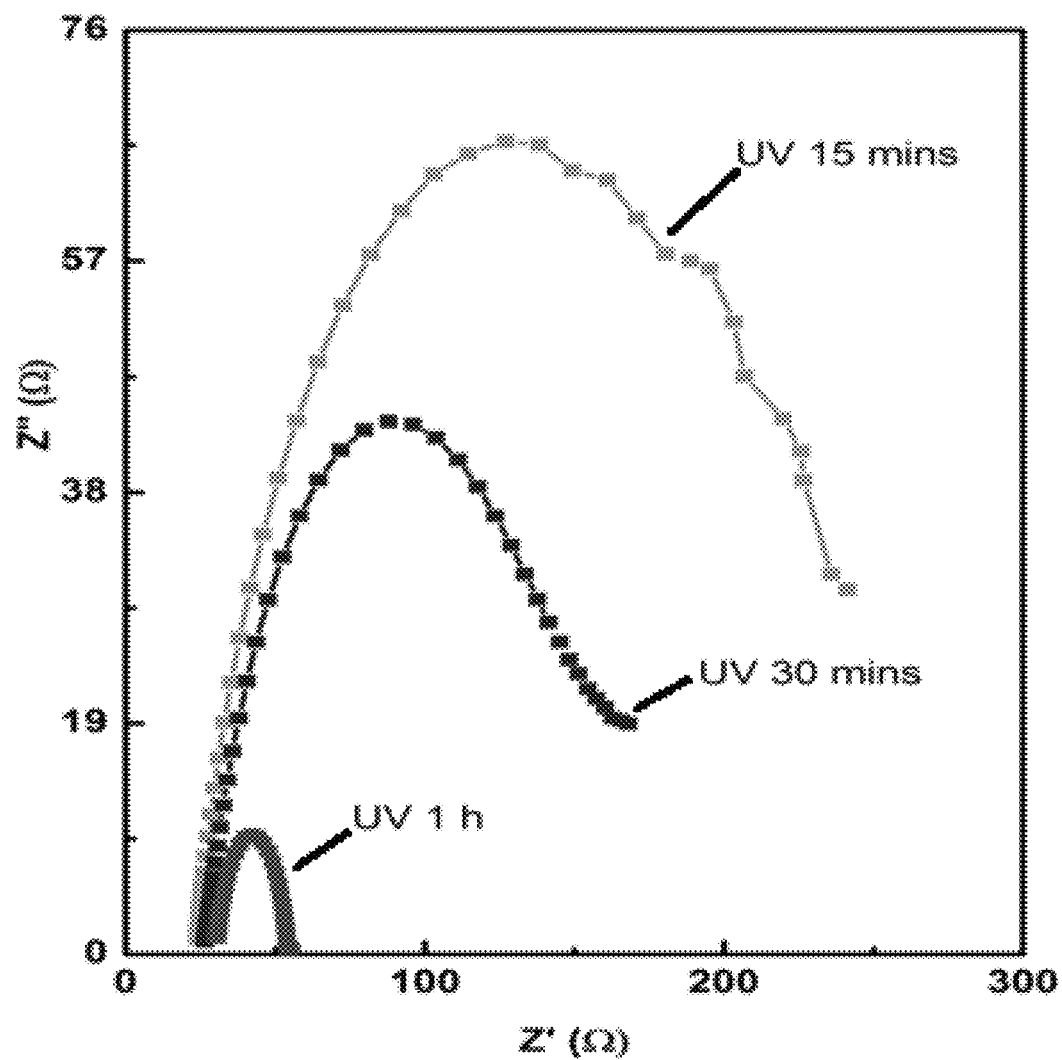
FIG. 4E shows Nyquist plots of photofabricated Pt CEs (Pt-EtOH-FTO) at different irradiation times of 1 h, 30 min, and 15 min.
Figure 4F:
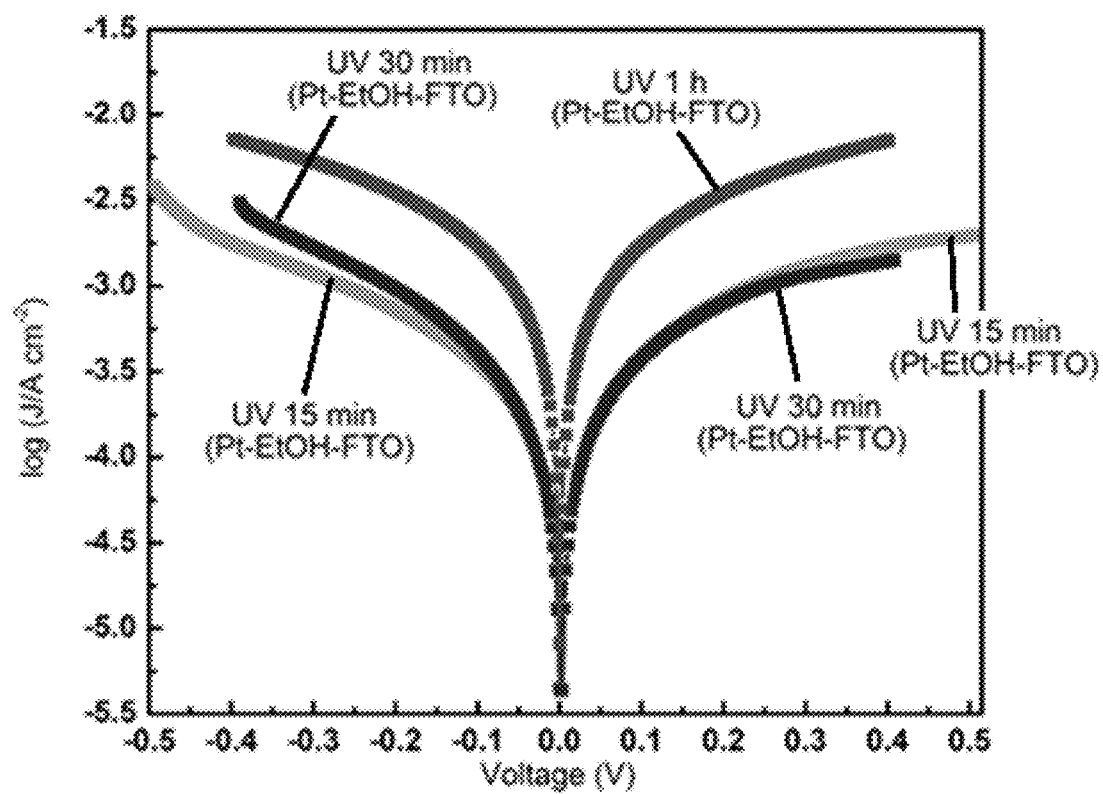
FIG. 4F shows Tafel plots of Pt-EtOH-FTO CEs with UV irradiation time of 1 h, 30 min, and 15 min.

The Nyquist plot parameters of all ethanolic based photofabricated Pt CEs are presented in Table 1, and the Nyquist plots are shown in FIG. 4E. Owing to the good Pt loading and high catalytic activity, the 1 h UV irradiated sample (Pt-EtOH-FTO) has a small series resistance and small charge transfer resistance. The Nyquist plots further confirmed the insufficiency of 15 min irradiation time for the photofabrication process. The series and charge transfer resistances are to be higher than all photofabricated Pt CEs. CPE follows similar dependency with UV irradiation time as that of Pt-EG-FTO CEs. The calculated $J_0$ values for the Pt-EtOH-FTO are also listed in Table 1. Tafel plots in FIG. 4F show Pt-EtOH-FTO with 1 h UV irradiation having the highest current density values for the anodic and cathodic current densities as compared with those of 30 and 15 min UV irradiation time.

Example 2

Photofabrication of Pt on PET-ITO

Figure 5A:
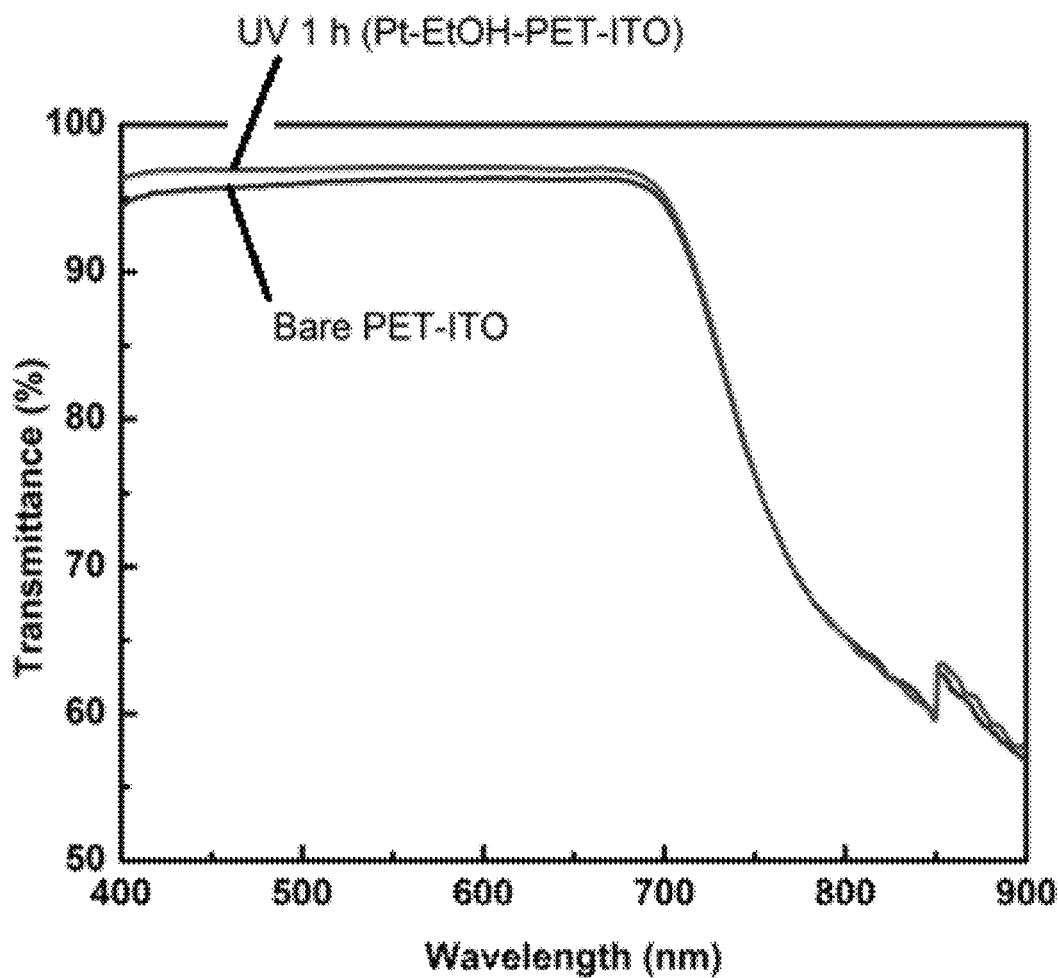
FIG. 5A shows the transmittance spectra of a photofabricated Pt flexible CE and a bare PET-ITO substrate.
Figure 5B:
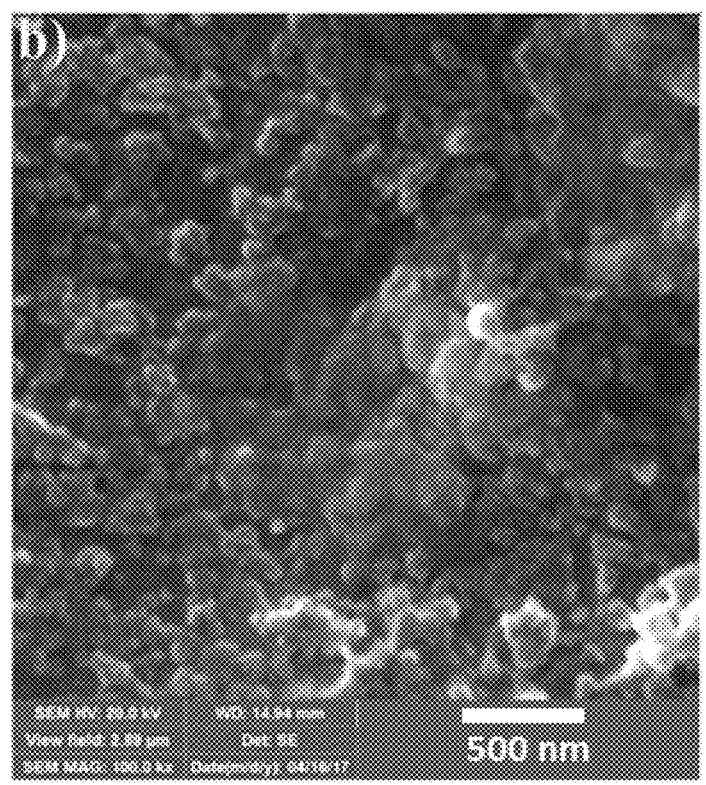
FIG. 5B shows an SEM image of photofabricated Pt CE (Pt-EtOH-ITO-PET) with 1 h UV irradiation time.
Figure 5C:
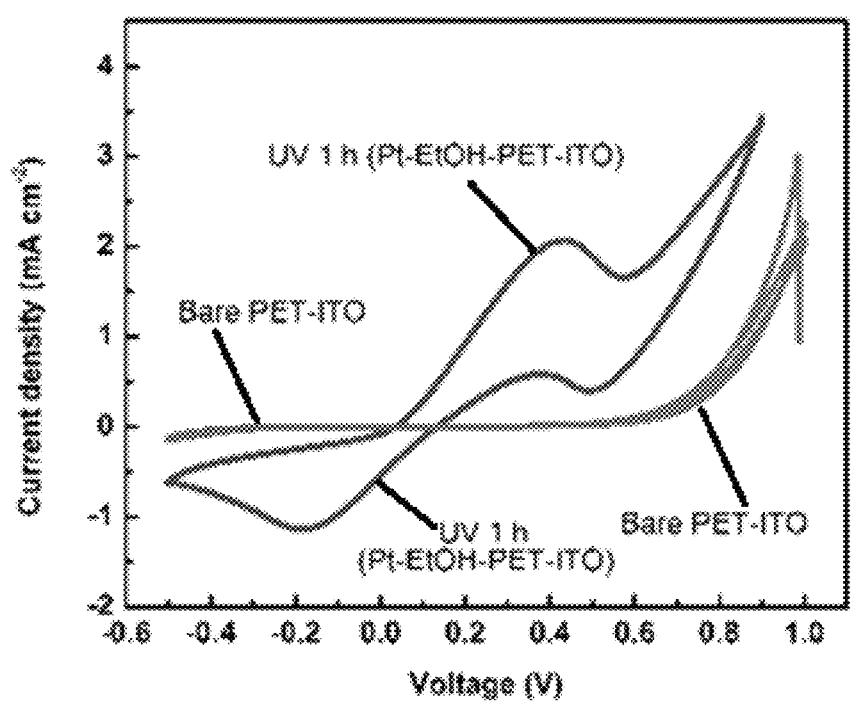
FIG. 5C shows a CV scan measurement of a photofabricated Pt CE (Pt-EtOH-PET-ITO) at an irradiation time of 1 h as compared with a bare PET-ITO substrate.
Figure 5D:
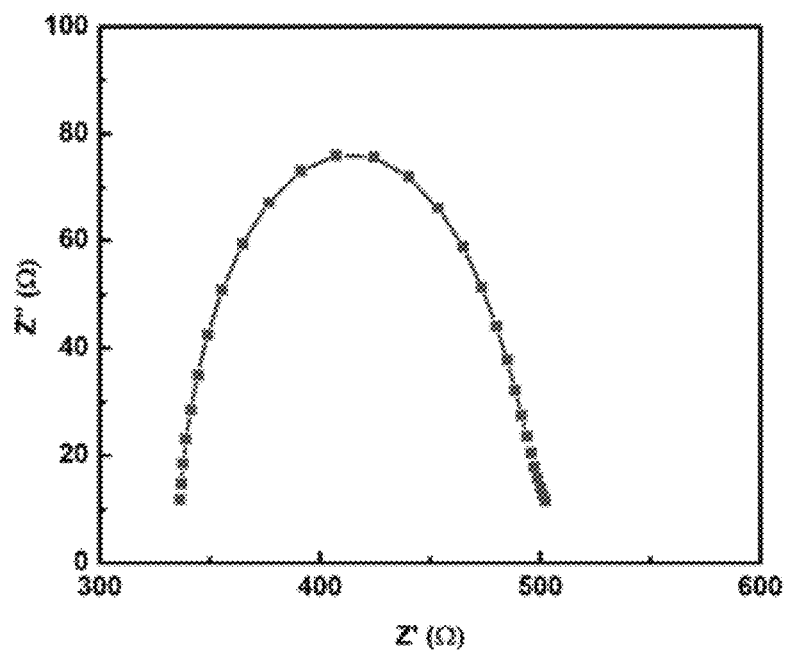
FIG. 5D shows a Nyquist plot of a photofabricated Pt CE (Pt-EtOH-PET-ITO) at an irradiation time of 1 h.
Figure 5E:
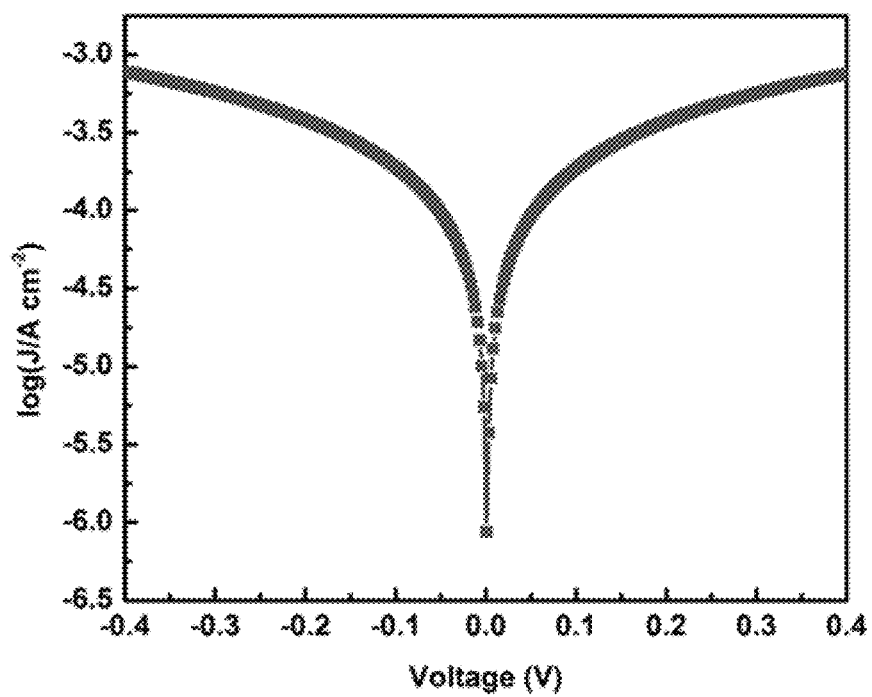
FIG. 5E shows a Tafel plot of a flexible Pt-EtOH-ITO-PET CE with 1 h UV irradiation time.

Flexible Pt CE on PET-ITO (Pt-EtOH-ITO-PET) was photofabricated as a demonstration of the versatility and potential area of application of the photofabrication technique. 5 µL ethanolic platinic acid precursor was drop casted on an exposed area of 0.25 cm² of PET-ITO substrate and then treated with 1 h UV irradiation. The ambient temperature did not exceed more than 40° C. during the UV irradiation, which makes it suitable for use on flexible substrates. FIG. 5A is the transmittance spectra of the photofabricated Pt flexible CE. The obtained spectra show improvement of the transparency of the photofabricated Pt flexible CE as compared to bare PET-ITO substrate. This is consistent with the transmittance results obtained for photofabricated Pt CEs on FTO substrates. FIG. 5B shows the SEM morphology image of the Pt flexible CE with both well dispersed Pt and agglomerated sites. The catalytic activities of photofabricated Pt flexible CE were investigated by CV scan, electrochemical impedance spectroscopy (EIS) Nyquist measurement, and Tafel plot. FIGS. 5C and 5D show the CV scan measurement and Nyquist plot, respectively, of the photofabricated Pt flexible CE. The Tafel plot is shown in FIG. 5E.

Example 3

Solar Cell Performance

Figure 6A:
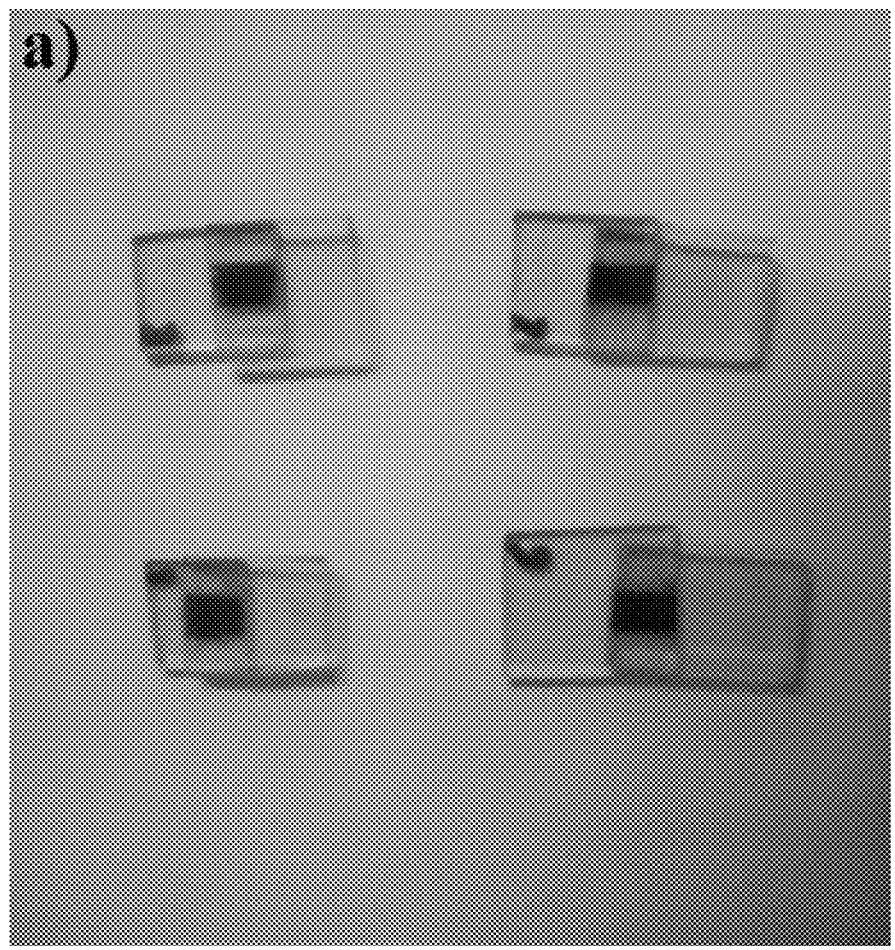
FIG. 6A is a photograph of a typical assembled cell samples using photofabricated Pt CEs on FTO substrates.
Figure 6B:
FIG. 6B is a flexible DSSC using a photofabricated Pt CE on a PET-ITO substrate.
Figure 8A:
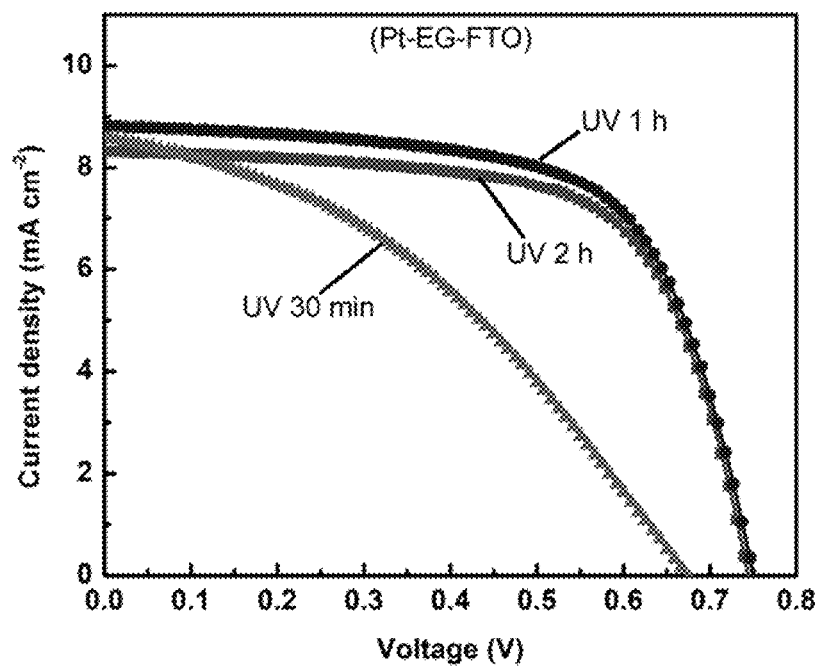
FIG. 8A shows a rear (or back) illumination I-V curve of DSSCs based on photofabricated Pt CEs (Pt-EG-FTO).
Figure 8B:
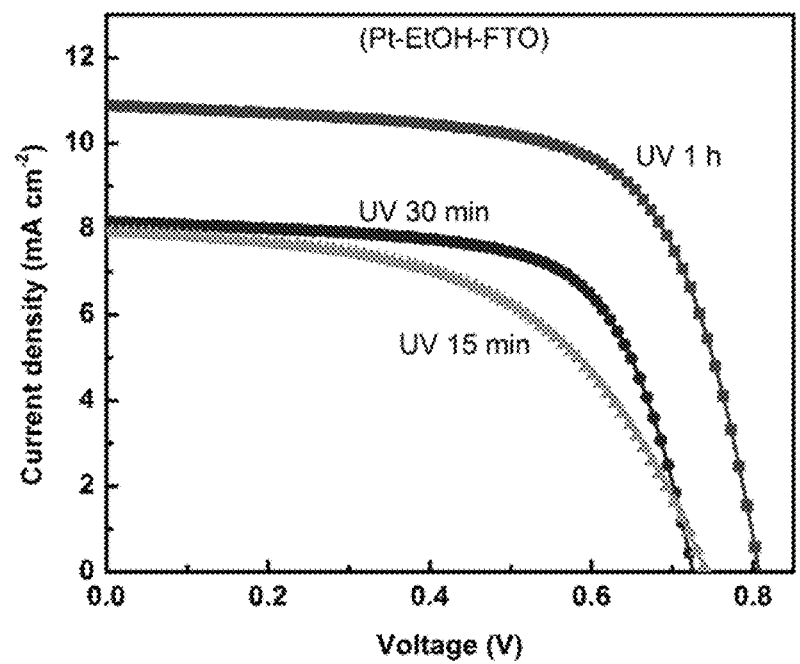
FIG. 8B shows a rear illumination I-V curve of DSSCs with photofabricated Pt CEs (Pt-EtOH-FTO).
Figure 8C:
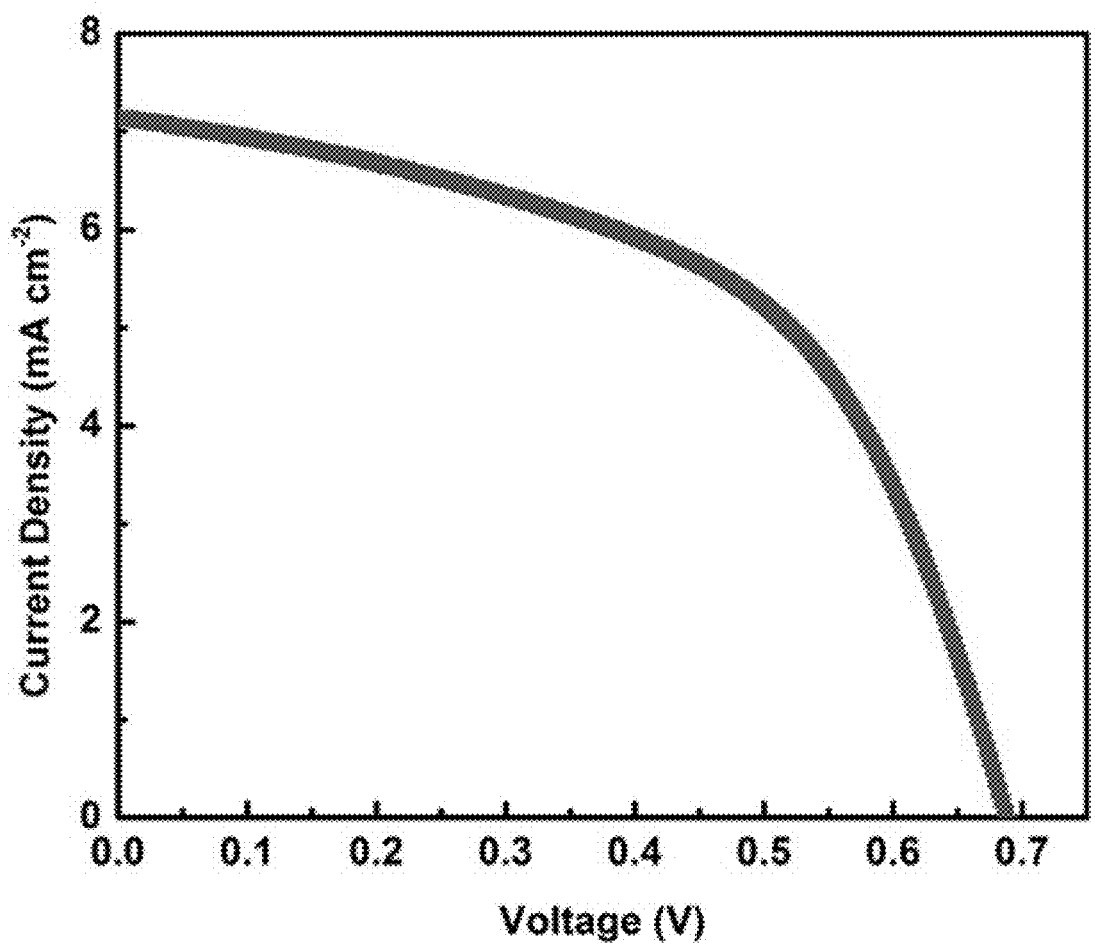
FIG. 8C shows a rear illumination I-V curve of a flexible DSSC with photofabricated Pt flexible CE (Pt-EtOH-ITO-PET).

The photofabricated Pt CEs were used for the fabrication of bifacial DSSCs (FIG. 1A), and their photovoltaic performances were measured under the illumination of an AM1.5G solar simulator at 100 mW·cm⁻² light intensity. FIG. 6A shows typical DSSCs fabricated using the photofabricated Pt CEs while FIG. 6B shows the image of the fabricated flexible DSSC (flex-DSSC) utilizing the photofabricated Pt flexible CE. The front and rear illuminated DSSCs I-V parameters are summarized in Table 2. FIG. 7A-7C illustrate the front illumination I-V curve (current density vs. voltage) for the spin-coated (Pt-EG-FTO), ethanol based drop coated (Pt-EtOH-FTO), and the flexible (Pt-EtOH-ITO-PET) CEs, respectively. FIGS. 8A-8C show the rear illumination I-V curves for the DSSCs fabricated with the respective Pt CEs. It is seen that the Pt CEs with 1 h UV irradiation time outperformed other Pt CEs with UV irradiation time other than 1 h for both EG and EtOH based fabricated Pt CEs, respectively. The good catalytic activities of Pt CEs fabricated with 1 h UV irradiation time were further confirmed by electrochemical CV, EIS, and Tafel characterizations. Solvent effect shows EtOH based Pt CEs to be better and more efficient for DSSCs than EG based Pt CEs. Pt-EtOH-FTO CE with 1 h UV photoreduction exhibited the best performance efficiency of 7.29% and the highest open circuit voltage ($V_{OC}$) of 810 mV for front illumination. In a similar trend, DSSC utilizing Pt-EtOH-FTO CE with 30 min UV irradiation performed better than all DSSCs fabricated with Pt-EG-FTO CEs with efficiency of 5.07% as compared to the best EG based CEs of 5.01% (for UV 1 h (Pt-EG-FTO)). Flexible DSSC based on UV 1 h (Pt-EtOH-ITO-PET) and employing ZnO as a photoanode recorded a PCE of 3.26%.

All DSSCs employing photofabricated Pt CEs retained more than 77% of their front illumination efficiencies when illuminated from the rear. The percentage ratio of the rear illumination efficiency to the front illumination efficiency ($\eta_R$) is given in Table 2. The $\eta_R$ trend is consistent with the reported transmittance spectra of the photofabricated CEs. UV 2 h (Pt-EG-FTO) CE retained the highest percentage conversion efficiency ratio at 85.92%, slightly above 85.42% of UV 1 h (Pt-EG-FTO) CE. Flexible DSSC recorded $\eta_R$ of 79.75%. Hence, our photofabrication technique proved adequate for utilization in bifacial DSSCs. The difference in PCEs between front and rear illumination is observed to be largely due to the reduced photocurrent density of the rear illuminated DSSCs. This reduction in photocurrent density can be ascribed to electrolyte layer in the cell which behaved as a barrier between the incident light radiation and the dye sensitizer. The electrolyte is known to reflect incident light away, thereby reducing the amount of light available for the photoexcitation of the dye molecules.

Figure 9B:
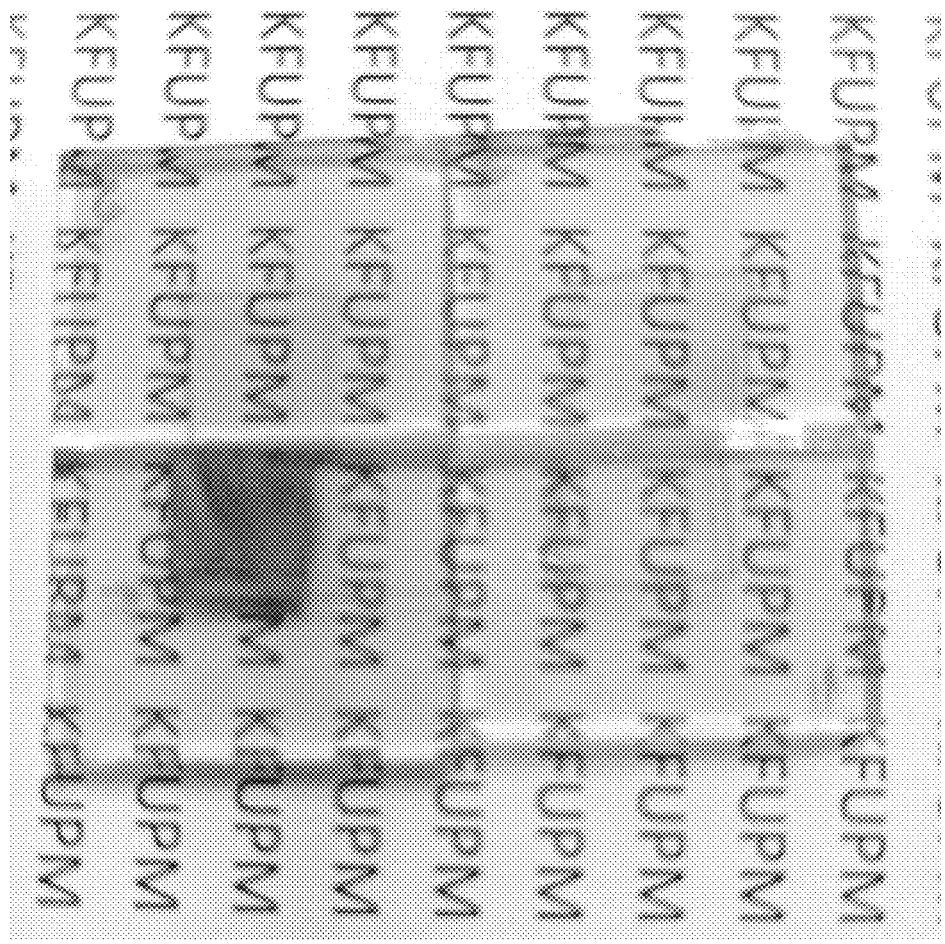
FIG. 9B shows a photograph of photofabricated Pt CEs (upper left, upper right, and bottom right), and an opaque thermally fabricated Pt CE (bottom left, darker square).
Figure 9C:
FIG. 9C shows a photograph of photofabricated Pt CEs (upper left, upper right, and bottom right), and a thermally fabricated Pt CE (bottom left, darker square).
Figure 9D:
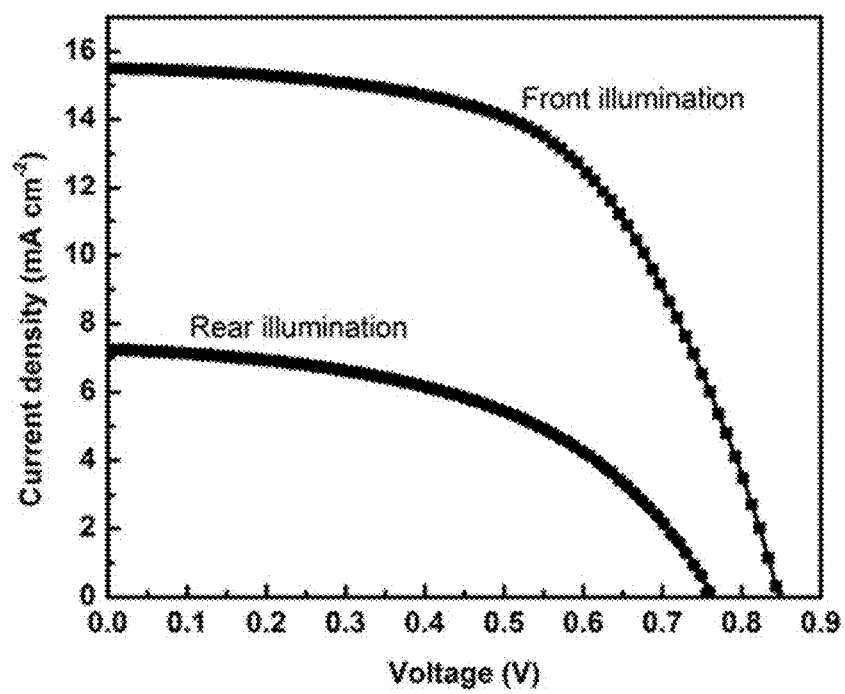
FIG. 9D shows I-V curves of front and rear illuminated DSSCs utilizing thermally fabricated Pt CE @ 450° C.
Figure 9E:
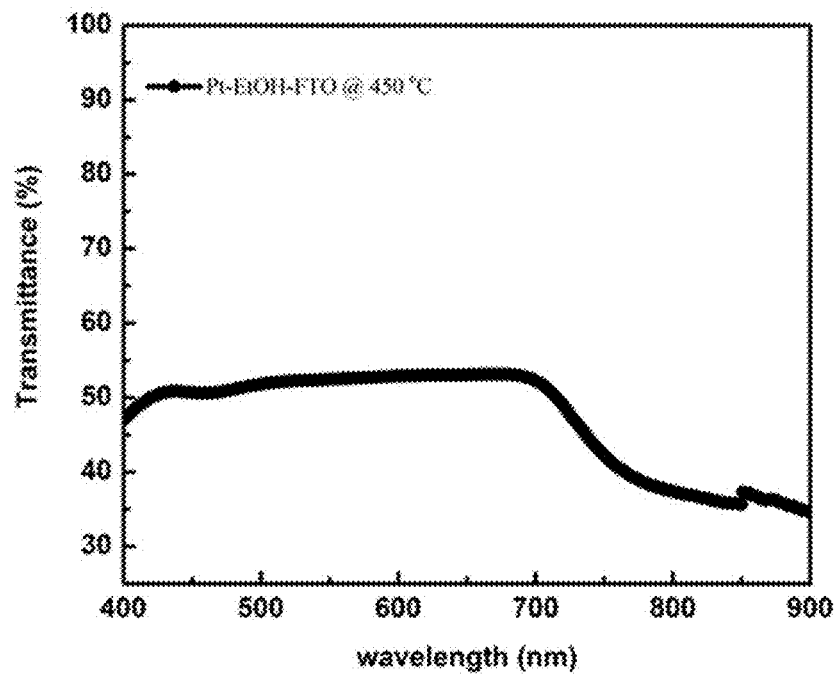
FIG. 9E shows a transmittance spectrum of thermally fabricated Pt CE @ 450° C.

FIG. 9A shows a picture of a typical transparent photofabricated Pt CE. FIGS. 9B and 9C both show a collection of four Pt CEs. The upper left, upper right, and bottom right samples of each figure are photofabricated Pt CEs, and the bottom left sample of each figure is the thermally fabricated Pt CE. As a reference for comparison, thermally fabricated Pt CE at 450° C. was used to fabricate DSSC. An efficiency of 7.54% was recorded slightly above the best photofabricated Pt CE DSSC. The photovoltaic parameters for this cell are listed in Table 2 for both front and rear illumination. FIG. 9D shows the front and rear illumination I-V curves for the DSSC fabricated with thermally prepared Pt CE. The rear illumination photovoltaic performance significantly deviates from the performance recorded for the front illumination. The deviation can be seen to result from the drastic drop in photocurrent density of the rear illuminated DSSC which consequently led to significant loss in fill factor. The high reflectance (low transmittance) of the thermally prepared Pt CE as shown in FIG. 9E is responsible for the observed loss in photovoltaic parameters with a significantly reduced PCE of 2.71%. A $\eta_R$ of 35.94% was recorded for this cell, which is 41.97% less than the photofabricated CE having a $\eta_R$ of 77.91%.

As shown above, a novel photofabrication technique was developed for the fabrication of highly transparent Pt CEs with the aid of UV irradiation on rigid FTO glass and flexible PET-ITO substrates. The facile and versatile photofabrication technique was used to fabricate Pt CEs that show better transmittance across the visible light spectrum of 400 to 700 nm wavelength than bare FTO glass and bare PET-ITO substrates. UV irradiation was found to improve both the transmittance and resistivity of bare FTO glass. Improved transmittance of photofabricated Pt CEs was found to be a function of increased UV irradiation time. XPS spectra confirmed the photoreduction of $H_2PtCl_6.6H_2O$ to Pt metal CEs. XPS results established 1 h UV irradiation as an advantageous photofabrication time. Catalytic activities of the photofabricated Pt CEs studied by CV scan measurement, EIS, and Tafel plot are found to depend on UV irradiation time as complete photoreduction is necessary for a better catalytic performance. SEM images revealed well-dispersed Pt nanoparticles on both the FTO and PET-ITO substrates. Investigation of solvent effects showed that ethanol as a volatile liquid is more suitable for the photofabrication technique as minimal Pt precursor is used. Thus, ethanol saves material costs compared to EG based platinic acid precursors, which must be spin coated instead of drop casted. Spin coating deposition technique make use of more precursor material that is largely wasted making it cost ineffective. The photofabricated Pt CEs were used to fabricate bifacial DSSCs with PCEs attaining 7.29% for front illumination and 5.85% for rear illumination as compare with DSSC utilizing thermally fabricated Pt CE having PCE of 7.54% and 2.71% for front and rear illumination respectively. The highest percentage ratio of the rear illumination efficiency to the front illumination efficiency ($\eta_R$) was recorded as 85.92% while the lowest $\eta_R$ is 77.91%.

TABLE 2

I-V characteristics parameters of photofabricated Pt CEs DSSCs

| Photofabricated Pt-CEs | Illumination | $J_{SC}$ (mA · cm$^{-2}$) | $V_{OC}$ (V) | FF (%) | $\eta$ (%) | $\eta_R$ (%) |
| --- | --- | --- | --- | --- | --- | --- |
| UV 2 h (Pt—EG—FTO) | Front | 9.68 | 0.74 | 66.47 | 4.76 | 85.92 |
|  | Rear | 8.32 | 0.74 | 66.43 | 4.09 |  |
| UV 1 h (Pt—EG—FTO) | Front | 10.31 | 0.75 | 64.90 | 5.01 | 85.42 |
|  | Rear | 8.82 | 0.75 | 65.15 | 4.28 |  |
| UV 30 min (Pt—EG—FTO) | Front | 10.59 | 0.69 | 38.49 | 2.81 | 79.36 |
|  | Rear | 8.57 | 0.67 | 38.88 | 2.23 |  |
| UV 1 h (Pt—EtOH—FTO) | Front | 13.53 | 0.81 | 66.56 | 7.29 | 80.25 |
|  | Rear | 10.89 | 0.802 | 67.03 | 5.85 |  |
| UV 30 min (Pt—EtOH—FTO) | Front | 10.40 | 0.74 | 66.77 | 5.07 | 77.91 |
|  | Rear | 8.16 | 0.72 | 67.18 | 3.95 |  |
| UV 15 min (Pt—EtOH—FTO) | Front | 9.79 | 0.75 | 53.10 | 3.92 | 78.57 |
|  | Rear | 7.93 | 0.74 | 52.62 | 3.08 |  |
| UV 1 h (Pt—EtOH—PET—ITO) | Front | 8.67 | 0.71 | 53.35 | 3.26 | 79.75 |
|  | Rear | 7.14 | 0.687 | 53.02 | 2.60 |  |
| Pt—EtOH—FTO @ 450° C. | Front | 15.49 | 0.84 | 57.73 | 7.54 | 35.94 |
|  | Rear | 7.225 | 0.759 | 49.51 | 2.71 |  |

*$\eta_R$ is the percentage ratio of the rear illumination to the front illumination.

Example 4

Materials and Method
Materials

Platinic ($H_2PtCl_6$) acid, ethylene glycol (EG) purriss grade, FTO glass (7 Ω·sq$^{-1}$) and ITO-PET (14·Ω·sq$^{-1}$). Lithium perchlorate (LiClO$_4$), iodine, and lithium iodide (LiI) were purchased from SIGMA ALDRICH. Acetone, 2-propanol, and methanol were purchased to from FISHER SCIENTIFIC. Ti-Nanoxide T/SP paste, and N719 sensitizer were all products of SOLARONIX, Switzerland. Iodide/triodide in acetylnitrile (AN) electrolyte was purchased from CHEMSOLARISM.

Platinum CE Photofabrication Process

FTO and ITO-PET substrates were cleaned successively using detergent, deionized (DI) water, acetone, and 2-propanol for 1 hour by ultrasonication using BRANSON 3510. The substrates were heated at 70° C. for 20 min to completely remove the organic cleaning agents. 0.02 M $H_2PtCl_6$ solution in EG was prepared. The $H_2PtCl_6$ readily dissolved in the EG solvent at room temperature. 20 µL of the platinic acid solution was then spin coated on the pre-cleaned FTO substrate with an exposed area of 0.25 $cm^2$ at 2000 rpm for 45 s using SPECIALTY COATING SYSTEM (SCS) 6800 SPIN COATER SERIES. The $H_2PtCl_6$ solution coated FTO substrate was then exposed to UV irradiation using LUMEN DYNAMICS OMNICURE SERIES 2000 at 2 $W \cdot cm^{-2}$ at a distance of 5 cm from the platinic acid coated FTO substrate in an ambient environment for a specific duration of time. The UV light intensity and temperature was measured by a homemade ARDUINO-based temperature sensor. The maximum temperature recorded at UV light intensity of 2 $W \cdot cm^{-2}$ was 40° C.

$TiO_2$ Photoanodes Fabrication $TiO_2$ photoanodes were prepared by blade coating Ti-Nanoxide T/SP paste on a 0.25 $cm^2$ exposed area of a pre-cleaned FTO glasses. The 0.25 $cm^2$ exposed area was achieved by covering the FTO glass with SCOTCH tape leaving only an area of 0.25 $cm^2$ for coating of $TiO_2$ photoanode. The $TiO_2$ coated FTO was heated at 450° C. for 30 min on a hot plate in open air. Prior to the heating, the masking SCOTCH tapes were removed. After the $TiO_2$ paste had been baked for 30 min, the $TiO_2$ photoanodes were allowed to cool down gradually to room temperature. The samples were then soaked in N719 dye solution for 24 h.

ZnO Flexible Photoanode Fabrication

For the flexible DSSC, ZnO semiconducting photoanode was employed due to its low temperature processing potential. ZnO dispersion in butanol was utilized for coating on ITO-PET. Prior to coating, the ZnO dispersion was stirred for 2 h at 60° C. to achieve needed viscosity for a paste-like ZnO, which was then blade coated on ITO-PET and sintered at 120° C. The sample was allowed to cool to room temperature before being immersed in N719 dye solution for 24 h.

N719 Dye Solution Preparation

N719 dye sensitizer was dissolved in methanol. The solution was sonicated for 30 min to dissolve the N719 dye. The prepared dye was used to sensitize all $TiO_2$ photoanodes and ZnO flexible photoanode.

Dye-Sensitized Solar Cells Coupling

The DSSCs fabrication was completed by coupling the photoanodes and the photofabricated Pt CEs using acrylic super glue gel. Triiodide/iodide electrolyte was introduced into the cells before being hand-pressed to seal the electrolyte in between the electrodes and completing the cells fabrication. The cells were left for some minutes prior to measuring the I-V characteristics.

Example 5

Characterization

XPS spectra of photofabricated CEs were carried out using THERMO-SCIENTIFIC ESCALAB-250Xi System equipped with monochromatic Al Kα radiation (hv=1486.6 eV). Spectra acquisition was done using a constant energy mode with a pass energy of 100 eV and 30 eV for the survey and the narrow scans, respectively. The analysis chamber base pressure was $4 \times 10^{-10}$ mbar. The photofabricated CE samples were mounted onto the sample holders with the aid of double-sided conductive adhesive tapes and outgassed in the sample loading chamber for 5 h at $2 \times 10^{-7}$ mbar. The XPS data acquisition was carried out using THERMO-SCIENTIFIC AVANTAGE software.

The morphology of the fabricated samples was studied using a LYRA TESCAN field emission scanning electron microscopy (FESEM) equipped with an accelerating voltage of 5 kV.

Transmittance spectra of the photofabricated samples were recorded using a JASCO 670 double beam spectrophotometer at wavelength range of 400 nm and 900 nm.

To study the catalytic activity of photofabricated Pt CE samples, three electrode cyclic voltammetry (CV) measurements were conducted. A saturated calomel electrode (SCE) served as the reference electrode, a platinum plate sheet electrode was used as the counter electrode, and the photofabricated Pt electrodes were placed as the working electrodes in the setup. The electrolyte contained 0.1 M lithium perchlorate ($LiClO_4$), 0.01 M lithium iodide (LiI) and 0.001 M iodine ($I_2$), all in acetonitrile (AN) solvent. The operating potential for the CV measurement ranged between −0.5 V and 1 V vs SCE. The CV measurement was carried out on an AUTOLAB PG302N equipped with NOVA 2.1 software.

The electrochemical impedance spectroscopy (EIS) measurement was carried out using AUTOLAB PG302N potentiostat equipped with NOVA 2.1 software. The Nyquist plot of the impedance parameters and Tafel plots were carried out on the system. The operating frequency ranged from 0.1 Hz to 100 kHz at a voltage scan rate of 10 mV/s.

The I-V characteristics of the photovoltaic performance of the fabricated DSSCs utilizing photofabricated Pt CEs were measured using the AUTOLAB PG302N potentiostat equipped with NOVA 1.11 software. An ORIEL lamp solar simulator calibrated to 100 $mW \cdot cm^{-2}$ was used as the light illumination source for the I-V characteristic measurement. An area of 0.25 $cm^2$ was exposed for the measurement.

As demonstrated above, Pt CEs were photofabricated with different solvents. The photofabrication process utilized UV irradiation of deposited solutions of $H_2PtCl_6$ to achieve Pt CEs. This novel method of fabricating Pt CEs requires no pre/post-thermal treatment and was carried out under ambient conditions. This method utilized minimal Pt loading and required no surfactant addition, which is usually required to be removed either by heating or other methods. Additionally, it is suitable for plastic substrates as no acidic treatment is performed in the fabrication process.

The invention claimed is:

1. A method of fabricating a flexible bifacial dye-sensitized solar cell, the method comprising:
    depositing a solution comprising a platinum precursor and an alcohol onto a first conductive layer of a first flexible substrate to produce a coated substrate;
    irradiating the coated substrate with a UV lamp to form crystalline platinum nanoparticles on the first substrate, thereby forming a flexible Pt counter electrode;
    separately applying a metal oxide on a second conductive layer of a second flexible substrate to form a metal oxide coated substrate, which comprises metal oxide particles on the second conductive layer of the second substrate;
    depositing a dye on the metal oxide particles, thereby forming a flexible photoanode; and sandwiching an electrolyte between the flexible Pt counter electrode and the flexible photoanode, wherein the electrolyte forms a first electrical contact to the dye and the metal oxide particles of the photoanode, wherein the electrolyte forms a second electrical contact to the platinum nanoparticles of the flexible Pt counter electrode, thereby fabricating the flexible bifacial dye-sensitized solar cell, and wherein the Pt nanoparticles have an average diameter of 100-450 nm.

2. The method of claim 1, wherein the Pt nanoparticles have a granular shape.

3. The method of claim 1, wherein the platinum precursor is $H_2PtCl_6$, $H_2PtCl_4$, $(NH_4)_2PtCl_6$, or $K_2PtCl_6$.

4. The method of claim 1, wherein the alcohol has a boiling point of 83° C. or lower at atmospheric pressure.

5. The method of claim 4, wherein the alcohol is methanol, ethanol, or isopropanol.

6. The method of claim 1, wherein the solution is deposited by dropping the solution onto the first conductive layer.

7. The method of claim 1, wherein the first conductive layer and the second conductive layer are transparent and are each independently selected from the group consisting of ITO, FTO, AZO, GZO, IZO, IZTO, IAZO, IGZO, IGTO, and ATO.

8. The method of claim 1, wherein the irradiating is done for a period of 45-75 minutes and at an average intensity of 0.1-10 $W \cdot cm^{-2}$.

9. The method of claim 1, wherein the first flexible substrate and the second flexible substrate each independently comprise a plastic selected from the group consisting of poly(ethylene terephthalate), poly(ethylene naphthalate), polycarbonate, polypropylene, polyimide, triacetyl cellulose, polyethersulfone, cyclo olefin copolymer, and polyarylite.

10. The method of claim 1, wherein the irradiating does not raise a surface temperature of the first flexible substrate above 50° C.

11. The method of claim 10, wherein the irradiating does not raise a surface temperature of the first flexible substrate above 40° C.

12. The method of claim 1, wherein the electrolyte comprises iodide.

13. The method of claim 1, wherein the metal oxide is at least one selected from the group consisting of ZnO, $TiO_2$, SnO, $Fe_2O_3$, $WO_3$, $CeO_2$, $BiVO_4$, $SrTiO_3$, and $BaTiO_3$.

14. The method of claim 13, wherein the metal oxide is ZnO.

15. The method of claim 1, wherein the flexible bifacial dye-sensitized solar cell has a percentage ratio of rear illumination efficiency to front illumination efficiency of 45-95%.

16. The method of claim 1, wherein the flexible bifacial dye-sensitized solar cell under AM1.5 irradiation applied as front or rear illumination has an open circuit voltage in a range of 0.4-1.0 V.

17. The method of claim 1, wherein the flexible bifacial dye-sensitized solar cell under AM1.5 irradiation applied as front illumination has a short circuit density of 5.0-17.0 $mA/cm^2$.

18. A method of fabricating a flexible bifacial dye-sensitized solar cell, the method comprising:

depositing a solution comprising a platinum precursor and an alcohol onto a first conductive layer of a first flexible substrate to produce a coated substrate;

irradiating the coated substrate with a UV lamp to form crystalline platinum nanoparticles on the first substrate, thereby forming a flexible Pt counter electrode;

separately applying a metal oxide on a second conductive layer of a second flexible substrate to form a metal oxide coated substrate, which comprises metal oxide particles on the second conductive layer of the second substrate;

depositing a dye on the metal oxide particles, thereby forming a flexible photoanode; and sandwiching an electrolyte between the flexible Pt counter electrode and the flexible photoanode, wherein the electrolyte forms a first electrical contact to the dye and the metal oxide particles of the photoanode, wherein the electrolyte forms a second electrical contact to the platinum nanoparticles of the flexible Pt counter electrode, thereby fabricating the flexible bifacial dye-sensitized solar cell, and wherein the metal oxide is applied in the form of a paste which is heated at a temperature of 100-150° C. to form the metal oxide coated substrate.

19. The method of claim 18, wherein the paste comprises butanol.

* * * * *

UNITED STATES PATENT AND TRADEMARK OFFICE
CERTIFICATE OF CORRECTION

PATENT NO. : 11,049,666 B2
APPLICATION NO. : 16/232758
DATED : June 29, 2021
INVENTOR(S) : Idris Kayode Popoola et al.

It is certified that error appears in the above-identified patent and that said Letters Patent is hereby corrected as shown below:

On the Title Page

Item (73), should read:
-- (73) Assignees: KING FAHD UNIVERSITY OF PETROLEUM AND MINERALS, Dhahran (SA); Imam Abdulrahman Bin Faisal University, Dammam (SA) --

Signed and Sealed this
Seventh Day of February, 2023

Katherine Kelly Vidal
*Director of the United States Patent and Trademark Office*